(12) United States Patent
Ono et al.

(10) Patent No.: US 11,515,563 B2
(45) Date of Patent: Nov. 29, 2022

(54) STACKING APPARATUS AND STACKING METHOD

(71) Applicant: TOYOTA JIDOSHA KABUSHIKI KAISHA, Toyota (JP)

(72) Inventors: Masato Ono, Nagoya (JP); Yuichi Itoh, Nisshin (JP); Yusuke Ikeda, Nisshin (JP); Kazuhito Kato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 17/120,411

(22) Filed: Dec. 14, 2020

(65) Prior Publication Data
US 2021/0257653 A1 Aug. 19, 2021

(30) Foreign Application Priority Data
Feb. 14, 2020 (JP) .............................. JP2020-023291

(51) Int. Cl.
*H01M 10/04* (2006.01)
*B65H 29/28* (2006.01)
*B65H 31/10* (2006.01)
*B65G 57/03* (2006.01)

(52) U.S. Cl.
CPC ...... *H01M 10/0468* (2013.01); *B65G 57/035* (2013.01); *B65H 29/28* (2013.01); *B65H 31/10* (2013.01); *H01M 10/0404* (2013.01)

(58) Field of Classification Search
CPC ..... H01M 10/00–0418; H01M 10/0431–0481; B65G 57/00–035; B65G 57/06–08; B65G 65/00–02; B65H 29/00–048; B65H 29/26–28; B65H 29/32; B65H 29/34; B65H 31/00–10
See application file for complete search history.

(56) References Cited

U.S. PATENT DOCUMENTS

| | | | | |
|---|---|---|---|---|
| 3,887,082 A | * | 6/1975 | Posselt | B27D 1/00 294/81.61 |
| 5,096,370 A | * | 3/1992 | Mohr | B65H 3/322 414/796 |
| 2005/0061426 A1 | * | 3/2005 | Parker | B32B 37/003 156/182 |

(Continued)

FOREIGN PATENT DOCUMENTS

| | | |
|---|---|---|
| JP | 2012221715 A | 11/2012 |
| JP | 2020024816 A | 2/2020 |
| JP | 2000153949 A | 6/2020 |

*Primary Examiner* — Jonathan Crepeau
*Assistant Examiner* — Jacob Buchanan
(74) *Attorney, Agent, or Firm* — Dickinson Wright, PLLC

(57) ABSTRACT

A stacking apparatus provided with a flexible conveyor plate (20), a clamp mechanism (25) for holding a sheet-shaped member carried on the conveyor plate (20) against the conveyor plate (20), and an adjustment mechanism able to adjust the degree of curvature of the conveyor plate (20). When stacking a new sheet-shaped member (1) carried on the conveyor plate (20) onto already stacked sheet-shaped members (1), the adjustment mechanism makes the conveyor plate (20) deform from a flat state to a curved state to make the new sheet-shaped member (1) carried on the conveyor plate (20) deform from a flat state to a curved state.

7 Claims, 24 Drawing Sheets

(56) References Cited

U.S. PATENT DOCUMENTS

| | | | |
|---|---|---|---|
| 2006/0261536 A1* | 11/2006 | Dangelewicz | B65H 5/16 271/90 |
| 2014/0020235 A1* | 1/2014 | Aramaki | H01M 10/0413 29/730 |
| 2014/0020240 A1* | 1/2014 | Watanabe | H01M 10/0404 29/730 |
| 2014/0027067 A1* | 1/2014 | Yuhara | H01M 10/0404 156/580 |
| 2016/0149254 A1* | 5/2016 | Ban | H01M 10/0413 29/623.3 |
| 2020/0044273 A1 | 2/2020 | Abe | |

* cited by examiner

STACKING APPARATUS AND STACKING METHOD

FIELD

The present invention relates to a stacking apparatus and a stacking method.

BACKGROUND

As one of the devices used for manufacture of a lithium ion secondary battery formed by a laminate of a bag type positive electrode and a negative electrode, a stacking apparatus for alternately stacking the bag type positive electrode and negative electrode has been known (for example, see Japanese Unexamined Patent Publication No. 2012-221715). In this stacking apparatus, a robot arm is used to alternately guide a rectangular sheet shaped bag type positive electrode and a rectangular sheet shaped negative electrode above a stacking table. These bag type positive electrodes and negative electrodes are successively stacked on the stacking table. To hold these bag type positive electrodes and negative electrodes in the stacked state on the stacking table, the four corners of the topmost bag type positive electrode or negative electrode in the stacked bag type positive electrodes and negative electrodes are pressed from above by clamp arms.

In this regard, in this stacking apparatus, when stacking a new bag type positive electrode or negative electrode, in the state pressing down the four corners of the topmost bag type positive electrode or negative electrode among the already stacked bag type positive electrodes and negative electrodes by the clamp arms, first, a flat front end face of the robot arm is used to press down a center part of the new bag type positive electrode or negative electrode against the stacked topmost bag type positive electrode or negative electrode.

At this time, the clamp arms are covered from above by the peripheral parts of the new bag type positive electrode or negative electrode. Next, in the state where the flat front end face of the robot arm is used to press down the stacked topmost bag type positive electrode or negative electrode, the clamp arms are retracted once to the above, then the four corners of the topmost bag type positive electrode or negative electrode are again pressed down by the clamp arms. By doing so, bag type positive electrodes and negative electrodes are successively stacked on the stacking table.

SUMMARY

Technical Problem

In this regard, however, in this stacking apparatus, when the clamp arms are moved upward, the peripheral parts of the stacked new bag type positive electrode or negative electrode are lifted up by the clamp arms and the peripheral parts of the stacked new bag type positive electrode or negative electrode are turned up. However, this turnup action causes extreme bending stress at the peripheral parts of the stacked new bag type positive electrode or negative electrode and cannot be said to be preferable. When the object to be stacked is a sheet shaped electrode for an all solid lithium ion secondary battery, if the peripheral parts of the sheet-shaped electrode are turned up in this way, there is the problem that the outer circumferential edges of the sheet-shaped electrode will be damaged and the sheet-shaped electrode will be cracked or will break.

Solution to Problem

Therefore, in the present invention, to prevent such a problem from occurring, there is provided a stacking apparatus comprising:
a flexible conveyor plate,
a clamp mechanism for holding a new sheet-shaped member carried on the conveyor plate against the conveyor plate, and
an adjustment mechanism able to adjust a degree of curvature of the conveyor plate, wherein the adjustment mechanism makes the conveyor plate deform from a flat state to a curved state to make the new sheet-shaped member carried on the conveyor plate deform from a flat state to a curved state when stacking the new sheet-shaped member carried on the conveyor plate onto already stacked sheet-shaped members.

Furthermore, according to the present invention, there is provided a stacking method for stacking a new sheet-shaped member on an already stacked sheet-shaped member, comprising:
arranging the new sheet-shaped member so as to be spaced from and aligned with the already stacked sheet-shaped member,
making the new sheet-shaped member deform from a flat state to a curved state to make a center part of the new sheet-shaped member press against the already stacked sheet-shaped members and,
stacking the new sheet-shaped member on the already stacked sheet-shaped members in a state where the center part of the new sheet-shaped member is made to press against the already stacked sheet-shaped members.

Advantageous Effects of Invention

It is possible to accurately stack a new sheet-shaped member aligned with already stacked sheet-shaped members so that excessive bending stress is not caused at the peripheral parts of the new sheet-shaped member.

DESCRIPTION OF EMBODIMENTS

Figure 2A:
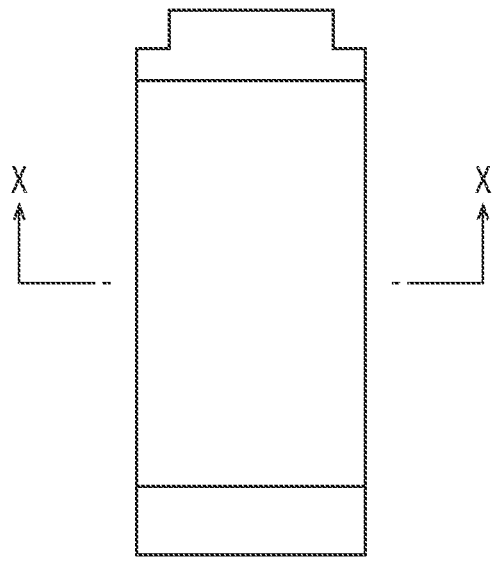
FIGS. 2A, 2B, 2C, and 2D are views for explaining a unit battery and a sheet-shaped electrode.
Figure 2B:
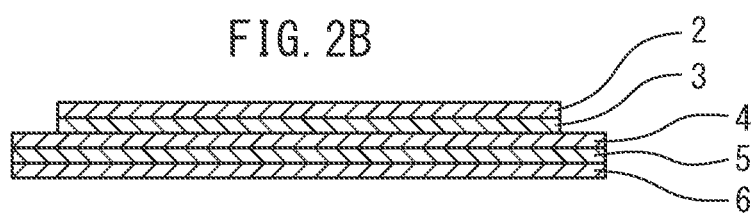

For example, when manufacturing a battery to be mounted in a vehicle, first a large amount of sheet-shaped electrodes are prepared. Next, the sheet-shaped electrodes are stacked. An electrode stack is formed by this. A plurality of electrode stacks thus formed are electrically connected in series or in parallel to thereby form the battery. The present invention relates to a stacking apparatus and stacking method for sheet-shaped members able to be applied when stacking sheet-shaped electrodes to form an electrode stack. Note that, below, embodiments according to the present invention will be explained using as an example the case of using sheet-shaped electrodes as the sheet-shaped members. Therefore, first, the sheet-shaped electrode used in the embodiment of the present invention will be explained. FIG. 2A and FIG. 2B respectively show a plan view of a component of a battery manufactured using this sheet-shaped electrode, that is, a unit battery, and a cross-sectional view of a unit battery seen along the X-X line of FIG. 2A. Note that, the thickness of the unit battery is 1 mm or less. Therefore, in FIG. 2B, the thickness of each layer is shown considerably exaggerated.

Referring to FIG. 2B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The positive electrode current collector layer 2 is formed from a conductive material. In the embodiment according to the present invention, this positive electrode current collector layer 2 is formed from metal foil for current collection use, for example, aluminum foil. Further, the positive electrode active material layer 3 is formed from a positive electrode active material able to store lithium ions, sodium ions, calcium ions, and other metal ions at the time of discharge and to release them at the time of charging. Further, the solid electrolyte layer 4 is formed from a material having conductivity with respect to lithium ions, sodium ions, calcium ions, and other metal ions and able to be utilized as a material for an all solid state battery.

On the other hand, the negative electrode active material layer 5 is formed from a negative electrode active material able to release lithium ions, sodium ions, calcium ions, and other metal ions at the time of discharge and to store them at the time of charging. Further, the negative electrode current collector layer 6 is formed from a conductive material. In the embodiment according to the present invention, this negative electrode current collector layer 2 is formed from metal foil for current collection use, for example, copper foil. Further, as will be understood from the above-mentioned explanation, the batteries manufactured in the embodiment of the present invention are all solid state batteries, and in this case, the batteries are preferably all solid lithium ion secondary batteries.

Figure 2C:
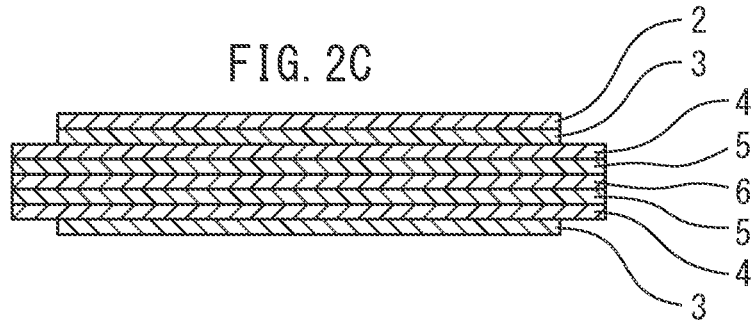
Figure 2D:
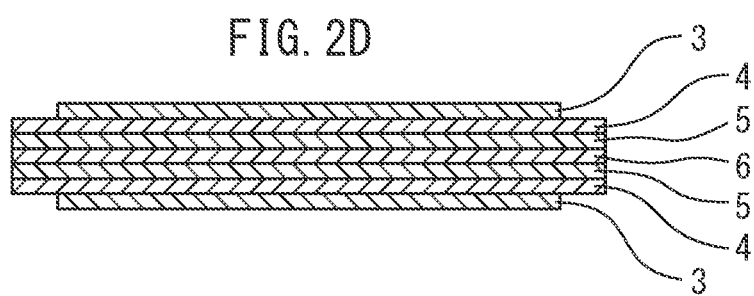

Now then, a sheet-shaped electrode used in the embodiment according to the present invention has a rectangular plan shape similar to FIG. 2A and has a cross-sectional structure shown in FIG. 2C or FIG. 2D. Note that, these FIG. 2C and FIG. 2D show cross-sectional views at positions similar to the X-X line of FIG. 2A. Note that, in these FIG. 2C and FIG. 2D as well, in the same way as FIG. 2B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The sheet-shaped electrode shown in FIG. 2C has a negative electrode current collector layer 6 positioned at its center part. In the upward direction from this negative electrode current collector layer 6, a negative electrode active material layer 5, solid electrolyte layer 4, positive electrode active material layer 3, and positive electrode current collector layer 2 are successively formed. In the downward direction from the negative electrode current collector layer 6, a negative electrode active material layer 5, solid electrolyte layer 4, and positive electrode active material layer 3 are successively formed. In this case, in the embodiment according to the present invention, the negative electrode current collector layers 6 are formed from copper foil, while the positive electrode current collector layers 2 are formed from aluminum foil.

On the other hand, the sheet-shaped electrode shown in FIG. 2D has a negative electrode current collector layer 6 positioned at its center part. In each of the upward direction and downward direction from this negative electrode current collector layer 6, a negative electrode active material layer 5, solid electrolyte layer 4, and positive electrode active material layer 3 are successively formed. That is, the sheet-shaped electrode shown in FIG. 2D does not have the positive electrode current collector layer 2. In the case shown in FIG. 2D as well, the negative electrode current collector layer 6 is formed from copper foil. In the embodiment according to the present invention, the sheet-shaped electrode of the cross-sectional shape shown in FIG. 2D is formed in advance. As explained later, in the middle of the stacking process, aluminum foil (positive electrode current collector) is bonded to the sheet-shaped electrode of the cross-sectional shape shown in FIG. 2D. As a result, the sheet-shaped electrode of the cross-sectional shape shown in FIG. 2C, that is, the sheet-shaped electrode with aluminum foil 2 bonded to it, is formed.

In the embodiment according to the present invention, the sheet-shaped electrode to which this aluminum foil 2 is bonded is called the "sheet-shaped electrode 1". Note that, in the explanation of the embodiments according to the present invention, if not considered particularly confusing, the sheet-shaped electrode of the cross-sectional shape shown in FIG. 2D to which no aluminum foil 2 is bonded will also be called a "sheet-shaped electrode 1". As opposed to this, if it is desirable to express differentiated the sheet-shaped electrode 1 to which aluminum foil 2 is bonded and the sheet-shaped electrode 1 to which aluminum foil 2 is not bonded, the sheet-shaped electrode to which aluminum foil 2 is bonded will be called a "sheet-shaped electrode 1 with a positive electrode", while the sheet-shaped electrode to which aluminum foil 2 is not bonded will be referred to as a "sheet-shaped electrode 1 without a positive electrode".

Note that, the sheet-shaped electrodes 1 shown in FIG. 2C and FIG. 2D show single illustrations. Use of various structures of sheet-shaped electrodes 1 may be considered. For example, on one surface of the copper foil 6, it is possible to form a negative electrode active material layer 5, solid electrolyte layer 4, positive electrode active material layer 3, and positive electrode current collector layer 2, to form a negative electrode active material layer 5, solid electrolyte layer 4, and positive electrode active material layer 3, to form a negative electrode active material layer 5 and solid electrolyte layer 4, or to form only a negative electrode active material layer 5, while on the other surface of the copper foil 6, it is possible to form a negative electrode active material layer 5 and solid electrolyte layer 4 or form only a negative electrode active material layer 5 or to not form anything. Further, instead of the copper foil 6, it is possible to use the aluminum foil for forming the positive electrode current collector layer 2 and form on one surface of this aluminum foil 2 a positive electrode active material layer 3, solid electrolyte layer 4, negative electrode active material layer 5, and negative electrode current collector layer 6, to form a positive electrode active material layer 3, solid electrolyte layer 4, and negative electrode active material layer 5, to form a positive electrode active material layer 3 and solid electrolyte layer 4, or to form only a positive electrode active material layer 3 and possible to form on the other surface a positive electrode active material layer 3, solid electrolyte layer 4, and negative electrode active material layer 5, to form a positive electrode active material layer 3 and solid electrolyte layer 4, to form only a positive electrode active material layer 3, or to not form anything at all in the structure.

Therefore, if expressing this comprehensively, in the present invention, the sheet-shaped electrode 1 includes metal foil 2 or 6 for current collection use and at least one of a positive electrode active material layer 3 and negative electrode active material layer 5 formed on the metal foil 2 or 6 for current collection use. Note that, below, embodiments of the present invention will be explained taking as an example the case of the sheet-shaped electrode 1 having a structure shown in any of FIG. 2C and FIG. 2D.

Figure 1:
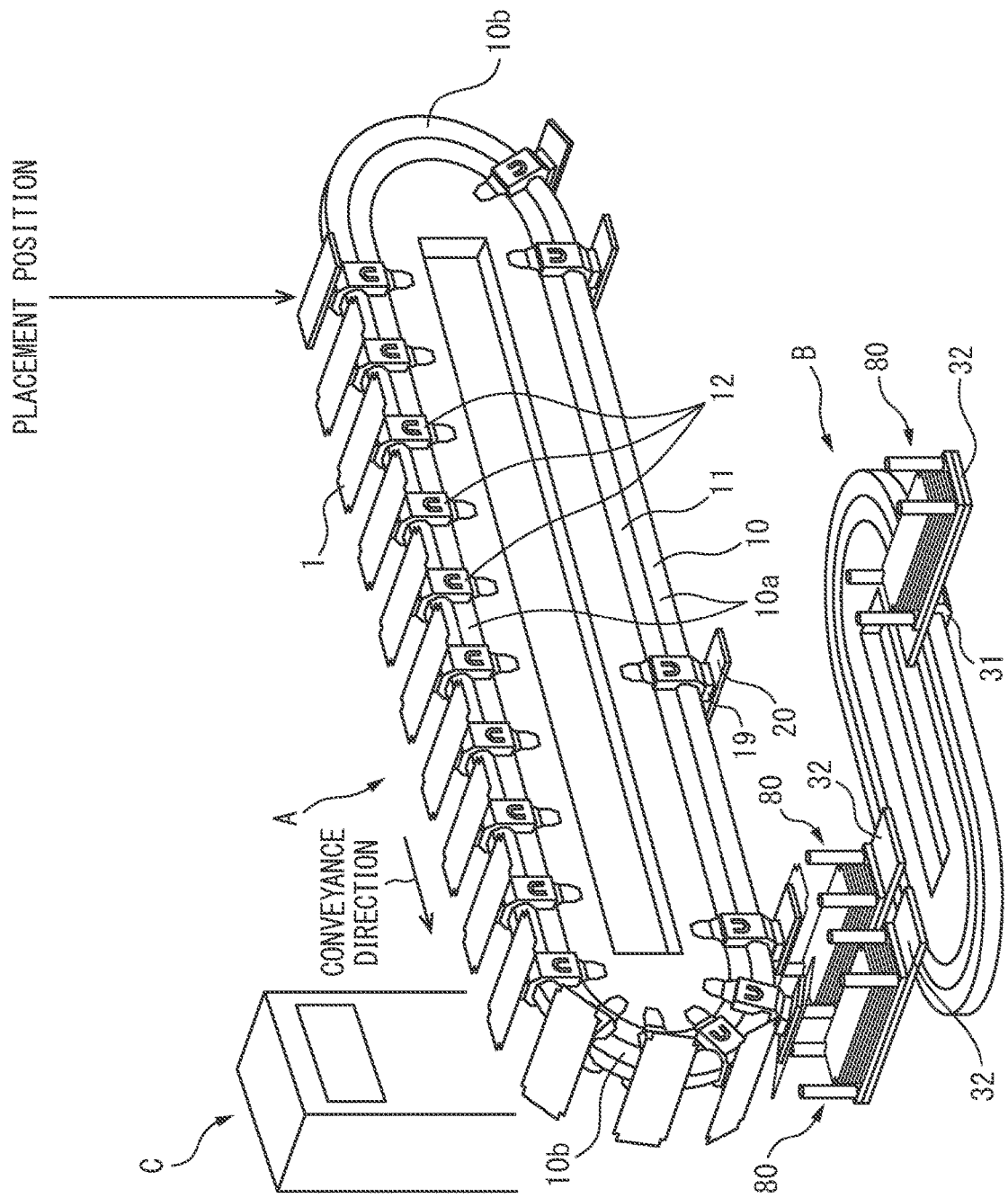
FIG. 1 is an overall view of a plate conveyance device and jig conveyance device.

Referring to FIG. 1, FIG. 1 shows a plate conveyance device A, jig conveyance device B, and operation control device C. The plate conveyance device A is supplied with a sheet-shaped electrode 1 without a positive electrode with a cross-sectional shape shown in FIG. 2D at a placement position shown by the arrow in FIG. 1. This sheet-shaped electrode 1 is conveyed by the plate conveyance device A in the direction of conveyance shown by the arrow for forming an electrode stack including the sheet-shaped electrode 1.

Figure 3:
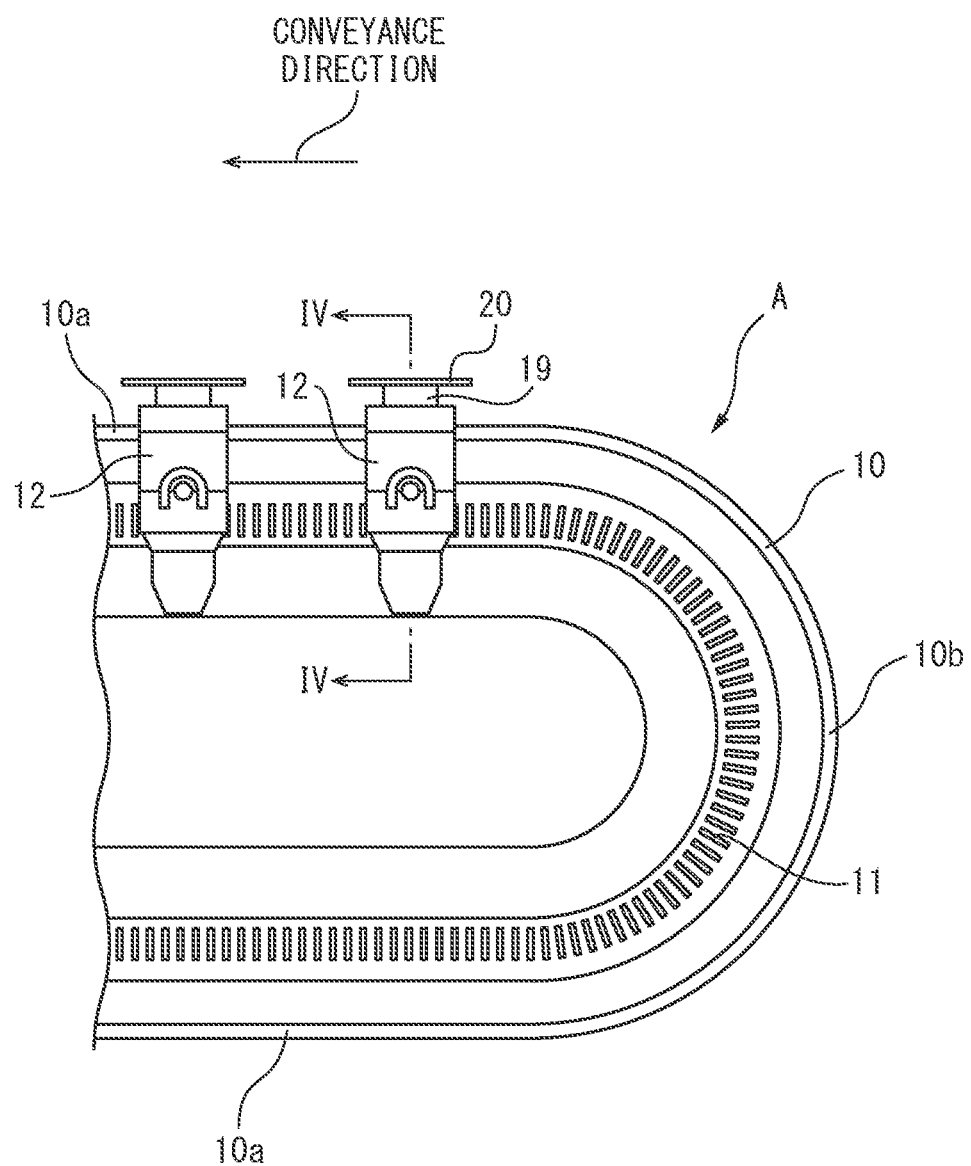
FIG. 3 is an enlarged side view of part of the plate conveyance device shown in FIG. 1.
Figure 4:
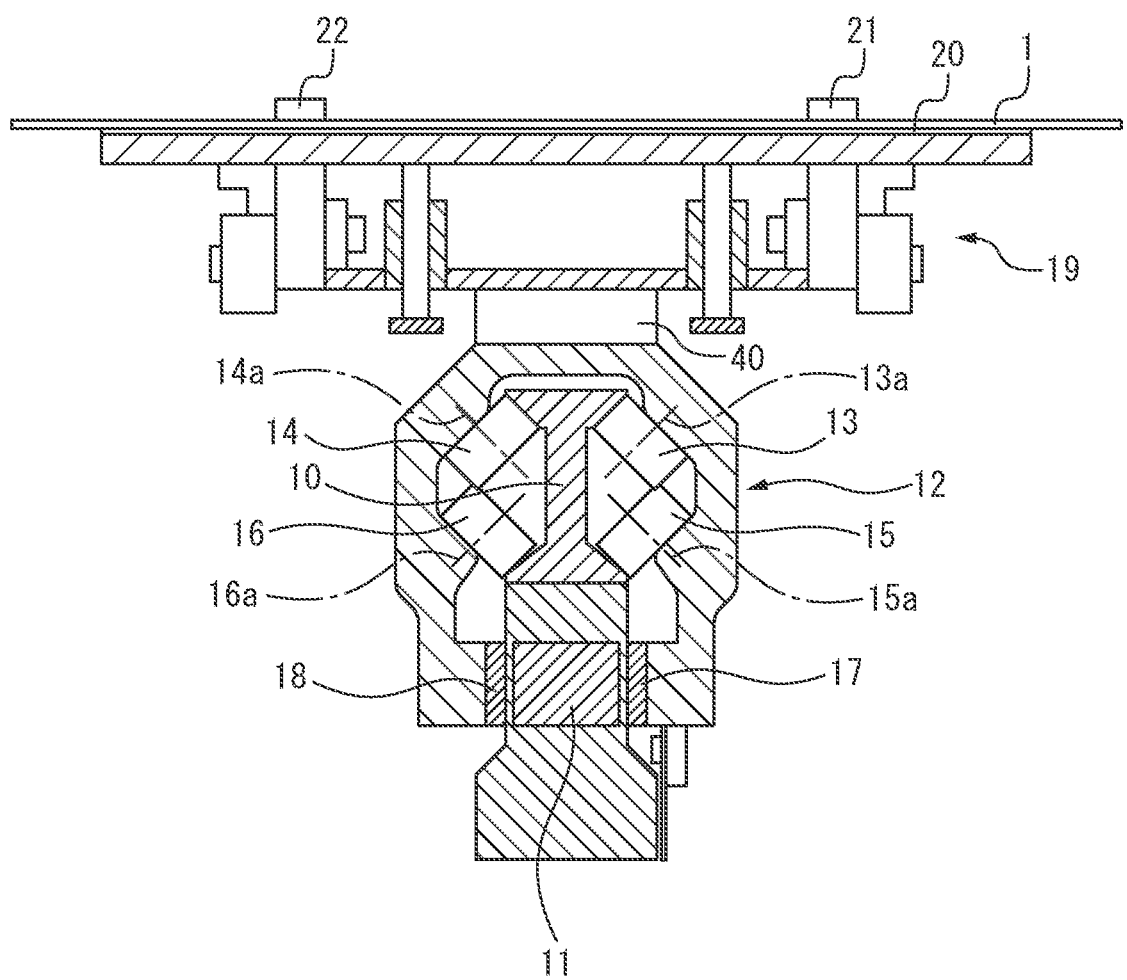
FIG. 4 is a cross-sectional view of a mover.

Next, this plate conveyance device A will be explained. FIG. 3 shows an enlarged side view of part of the plate conveyance device A shown in FIG. 1. Referring to FIG. 1 and FIG. 3, the plate conveyance device A is provided with an elliptical shaped rail 10 comprised of horizontal straight parts 10a spaced apart from each other in the vertical direction in the vertical plane and a pair of semicircular parts 10b and a plurality of movers 12 able to run on this rail 10. FIG. 4 shows a cross-sectional view of the mover 12 seen along the IV-IV line of FIG. 3. As shown in FIG. 4, this mover 12 is provided with a pair of guide rollers 13 attached to the mover 12 to be able to rotate about an axis 13a and roll on the rail 10 (arranged at the front and rear in the direction of advance), a pair of guide rollers 14 attached to the mover 12 to be able to rotate about an axis 14a and roll on the rail 10 (arranged at the front and rear in the direction of advance), a guide roller 15 attached to the mover 12 to be able to rotate about an axis 15a and roll on the rail 10, and a guide roller 16 attached to the mover 12 to be able to rotate about an axis 16a and roll on the rail 10.

On the other hand, this mover 12 is provided with a pair of permanent magnets 17, 18. Inside of the plate conveyance device A sandwiched between these permanent magnets 17, 18, a stator 11 around which a coil is wound is arranged. This stator 11 and permanent magnets 17, 18, that is, the stator 11 and mover 12, form a linear motor. Therefore, in the plate conveyance device A, the mover 12 of the linear motor is made to run on the rail 10. The speed of movement of this mover 12 etc. are controlled by the operation control device C.

Figure 5:
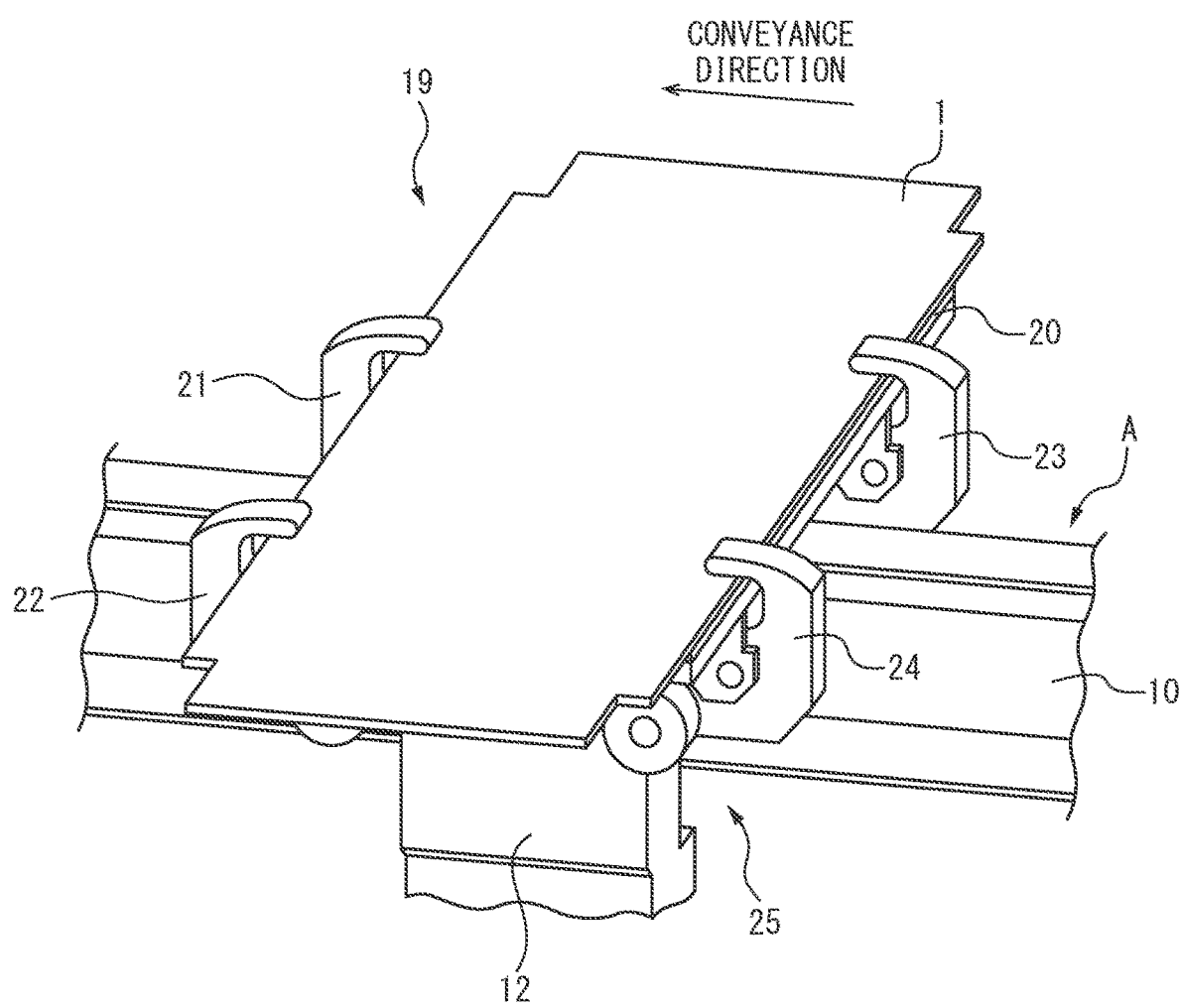
FIG. 5 is a perspective view of a conveyor plate support.

As shown in FIG. 3 and FIG. 4, on the mover 12, a conveyor plate carrier 19 carrying a rectangular shaped conveyor plate 20 is attached. On this conveyor plate 20, a sheet-shaped electrode 1 is placed. FIG. 5 shows a perspective view of the conveyor plate 20 attached to the mover 12. Referring to FIG. 5, in the embodiment according to the present invention, the conveyor plate 20 has a clamp mechanism 25 comprised of a plurality of clamps 21, 22, 23, 24 for clamping the sheet-shaped electrode 1 carried on the conveyor plate 20 against the conveyor plate 20 and holding the sheet-shaped electrode 1 at the placement position on the conveyor plate 20 during conveyance. In the embodiment shown in FIG. 5, a pair of clamps 21, 22 are attached spaced apart from each other at the front end part of the conveyor plate 20 positioned at the front in the direction of advance while a pair of clamps 23, 24 are attached spaced apart from each other at the rear end part of the conveyor plate 20 positioned at the rear in the direction of advance.

Figure 6:
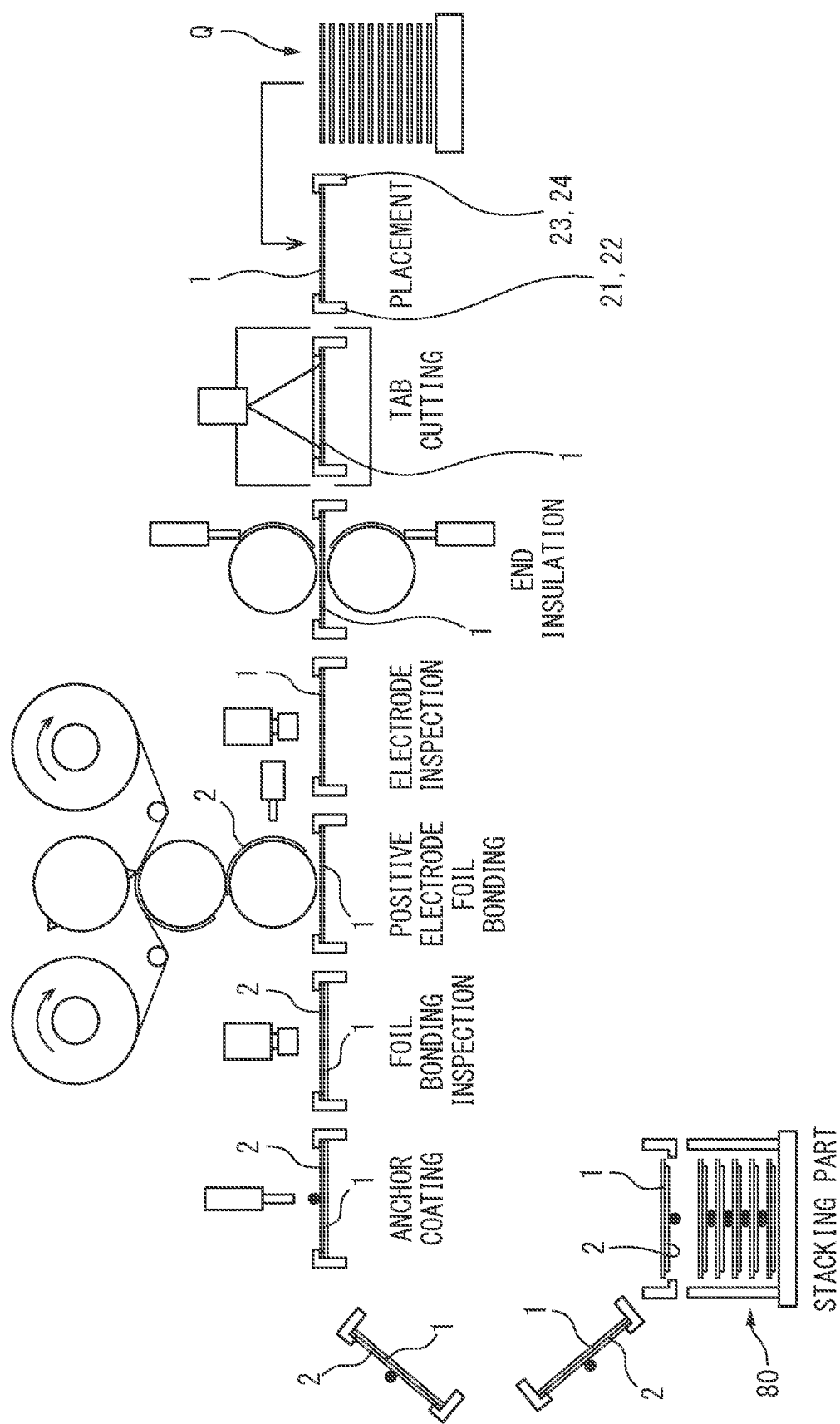
FIG. 6 is a view showing a stacking process of sheet-shaped electrodes.

Next, referring to FIG. 6, the process of stacking the sheet-shaped electrodes will be explained. FIG. 6 schematically shows this process of stacking the sheet-shaped electrodes. This FIG. 6 schematically shows the sheet-shaped electrodes 1 carried on the conveyor plates 20 and clamps 21, 22, 23, 24 attached to the conveyor plate carrier 19. However, in FIG. 6, the conveyor plates 20 are omitted. Note that, this FIG. 6 shows various processing when the sheet-shaped electrodes 1 are conveyed by the plate conveyance device A.

In the embodiment according to the present invention, the two surfaces of a long narrow copper foil are successively coated at intervals in the longitudinal direction of the copper foil with negative electrode active material layers, solid electrolyte layers, and positive electrode active material layers so as to be superposed on each other. Next, this copper foil is cut into predetermined lengths to thereby prepare sheet-shaped electrodes 1 without positive electrodes with the cross-sectional shapes shown in FIG. 2D. These sheet-shaped electrodes 1 without positive electrodes are stacked on a storage table for storage. Q in FIG. 6 shows the sheet-shaped electrodes 1 without positive electrodes stacked on the holding table. The sheet-shaped electrodes 1 stacked on the holding table are successively placed, one at a time, by a not shown transfer device onto the conveyor plates 20 at the upper horizontal straight rail part 10*a* of the plate conveyance device A as shown by the arrow in FIG. 6 at the placement position shown by the arrow of FIG. 1.

While the sheet-shaped electrode 1 carried on the conveyor plate 20 at the upper horizontal straight rail part 10*a* is moving along the horizontal straight part 10*a* of the plate conveyance device A, first, a tab cutting processing wherein an end part of the copper foil 6 is cut to form a connection use electrode tab is performed. Next, an end insulation processing for coating a part of the copper foil 6 with an insulating material to prevent a short-circuit with the aluminum (positive electrode) foil is performed. Next, an electrode inspection for inspecting whether or not the connection use electrode tab is correctly formed and whether or not the insulating material is correctly coated is performed. Next, a positive electrode foil bonding processing for bonding aluminum (positive electrode) foil 2 to the sheet-shaped electrode 1 by an adhesive is performed. If this positive electrode foil bonding processing is performed, the sheet-shaped electrode 1 becomes a sheet-shaped electrode with a positive electrode with a cross-sectional shape shown in FIG. 2C. Next, a foil bonding inspection for inspecting whether or not the aluminum (positive electrode) foil 2 is suitably bonded to the sheet-shaped electrode 1 is performed. Next, an anchor coating processing for coating the aluminum (positive electrode) foil 2 with an adhesive to prevent the stacked sheet-shaped electrodes 1 from shifting from each other when a sheet-shaped electrode 1 with a positive electrode is stacked is performed.

Next, when the conveyor plate 20 reaches the semicircular rail part 10*b* of the plate conveyance device A and starts to advance along the semicircular rail part 10*b*, as shown in FIG. 6, the conveyor plate 20 starts to be turned upside down. When the conveyor plate 20 reaches the bottom end of the semicircular rail part 10*b* of the plate conveyance device A, the conveyor plate 20 is completely turned upside down. In the embodiment according to the present invention, the action of stacking the sheet-shaped electrode 1 with a positive electrode for stacking the sheet-shaped electrode 1 with a positive electrode, which is carried on the conveyor plate 20, in a stacking jig 80 is performed in the state where the conveyor plate 20 is turned upside down in this way. This stacking action will be explained in detail later. Note that, if this stacking action is performed, the sheet-shaped electrode 1 with a positive electrode is removed from the conveyor plate 20 and the conveyor plate 20 becomes empty. Such empty conveyor plates 20 are successively made to move to the placement position shown in FIG. 1.

As explained above, in the embodiment according to the present invention, in the state with the conveyor plate 20 turned upside down, the action of stacking the sheet-shaped electrode 1 with a positive electrode, where the sheet-shaped electrode 1 with a positive electrode carried on the conveyor plate 20 is stacked inside the stacking jig 80, is performed. At this time, as shown in FIG. 6, the stacking jig 80 is conveyed so that the upper surface of the stacking jig 80 faces the sheet-shaped electrode 1 carried on the conveyor plate 20. In this case, in the embodiment according to the present invention, the conveyor plate 20 is made to move in the advancing direction while the stacking action is performed, so while the stacking action is being performed, the stacking jig 80 is conveyed so that the upper surface of the stacking jig 80 continues to face the sheet-shaped electrode 1 carried on the conveyor plate 20. Note that, the structure of this stacking jig 80 will be explained later.

Figure 7:
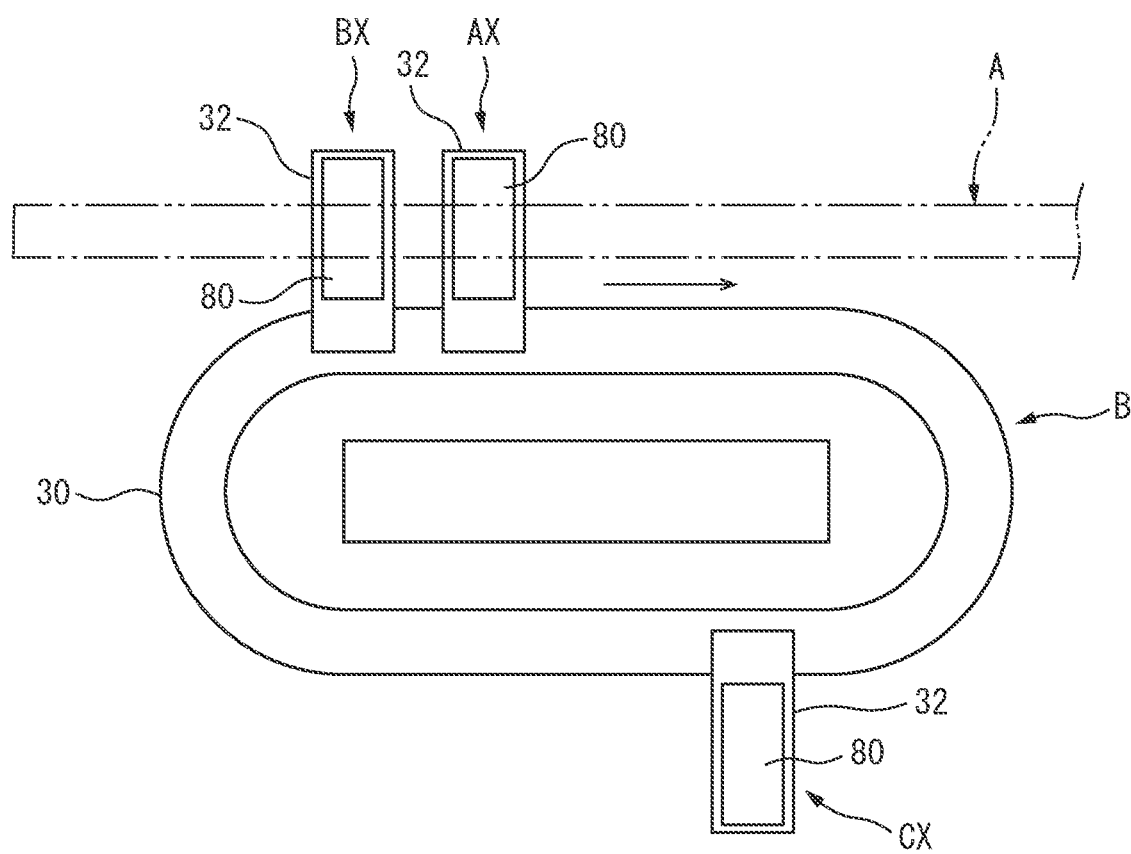
FIG. 7 is a plan view schematically showing the jig conveyance device.

This stacking jig 80 is conveyed by the jig conveyance device B. Therefore next a summary of the jig conveyance device B will be explained. FIG. 7 is a plan view schematically showing the jig conveyance device B shown in FIG. 1. This FIG. 7 shows the plate conveyance device A by a dot-dash line. Referring to FIG. 1 and FIG. 7, the jig conveyance device B is a smaller size version of the plate conveyance device A and has functions similar to the plate conveyance device A. That is, the jig conveyance device B is provided with an elliptical shaped rail 30 comprised of a pair of straight parts arranged in parallel and a pair of semicircular parts and a mover 31 of a linear motor running on this rail 30. The mover 31 has a structure similar to the mover 12 shown in FIG. 4. In this jig conveyance device B, the end part of a conveyor table 32 extending from the elliptical shaped rail 30 toward the outside in the horizontal direction is fixed to the mover 31. The stacking jig 80 is placed on this conveyor table 32.

In the embodiment according to the present invention, the jig conveyance device B is arranged so that the upper surface of the stacking jig 80 continues to face the sheet-shaped electrode 1 carried on the conveyor plate 20 while the stacking action is being performed, that is, so that the stacking jig 80 carried on the conveyor table 32 continues to move right underneath the plate conveyance device A while the stacking action is being performed. Furthermore, in the embodiment according to the present invention, the conveyor plate 20 and the conveyor table 32 are made to move synchronously so that the upper surface of the stacking jig 80 continues to face the sheet-shaped electrode 1 carried on the conveyor plate 20 while the stacking action is being performed.

In the example shown in FIG. 1 and FIG. 7, three conveyor tables 32 are provided. These conveyor tables 32 are made to move in the arrow direction in FIG. 7 by the mover 31. In FIG. 7, for example, when the work of stacking the sheet-shaped electrode 1 carried on a certain conveyor plate 20 on the stacking jig 80 is performed for the stacking jig 80 on the conveyor table 32 shown by AX, the work of stacking the sheet-shaped electrode 1 from the conveyor plate 20 following this conveyor plate 20 to the stacking jig 80 is performed for the stacking jig 80 on the conveyor table 32 shown by BX. On the other hand, the stacking jig 80 on the conveyor table 32 shown by CX shows the stacking jig 80 to which the work of stacking the sheet-shaped electrode 1 has already been completed. If the work of stacking the sheet-shaped electrode 1 to the stacking jig 80 has already been completed, the conveyor table 32 is made to move by a high speed to behind the preceding conveyor table 32, i.e., to the conveyor table 32 shown by BX in FIG. 7.

If a predetermined number of the sheet-shaped electrodes 1 with a positive electrode are stacked inside the stacking jig 80, the stacking jig 80 holding this predetermined number of the sheet-shaped electrodes 1 with a positive electrode is taken out from the jig conveyance device B, and an empty stacking jig 80 is placed on the conveyor table 32. The stacking jig 80 taken out from the jig conveyance device B is transported to the apparatus fabricating the electrode stack. In the apparatus fabricating this electrode stack, first, the sheet-shaped electrodes 1 with a positive electrode stacked inside the stacking jig 80 are compressed. Next, the compressed sheet-shaped electrodes 1 with a positive electrode are coated on their side surfaces with a resin. Next, aluminum (positive electrode) foil 2 is adhered to the outside-most sheet-shaped electrode 1. Next, a power takeout terminal is joined to the connection use power tab of the sheet-shaped electrode 1. Due to this, an electrode stack of the sheet-shaped electrodes 1 is formed. The thus formed electrode stack is, for example, covered by a laminate film in a bag manner. The plurality of electrode stacks covered by the laminate film in a bag manner are electrically connected in series or in parallel to thereby form for example a battery to be mounted in the vehicle.

Figure 8:
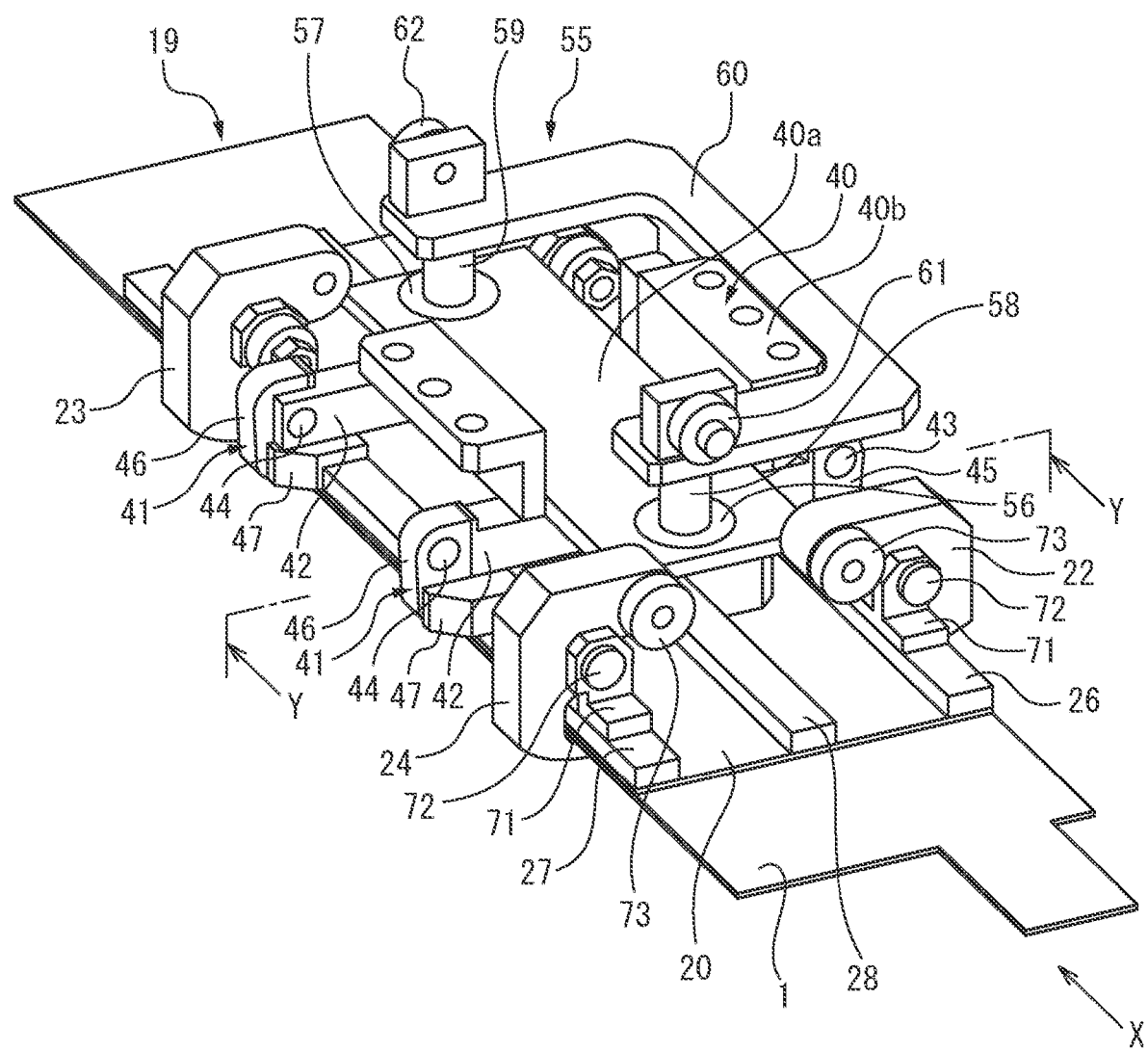
FIG. 8 is a view showing a back surface of a first embodiment of a conveyor plate support.
Figure 9:
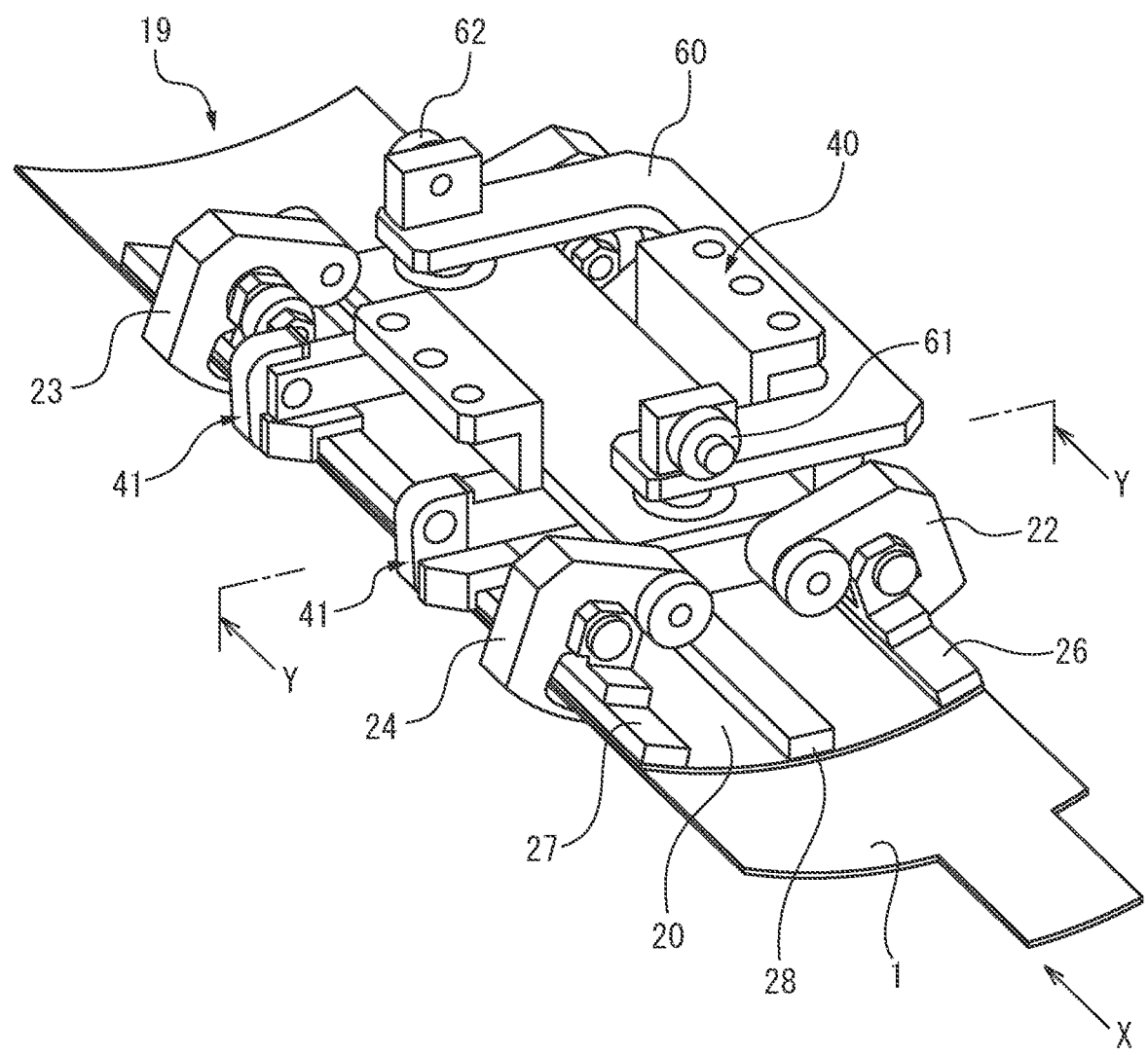
FIG. 9 is a view showing a back surface of the first embodiment of a conveyor plate support.
Figure 10A:
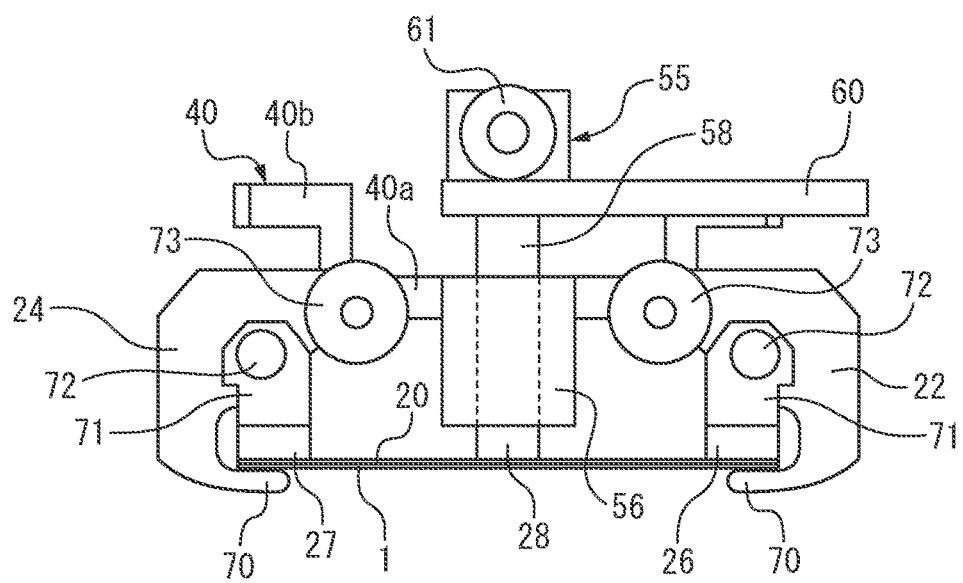
FIG. 10A, FIG. 10B, and FIG. 10C are side views of a conveyor plate support seen along the arrow X in FIG. 8 and FIG. 9.
Figure 10B:
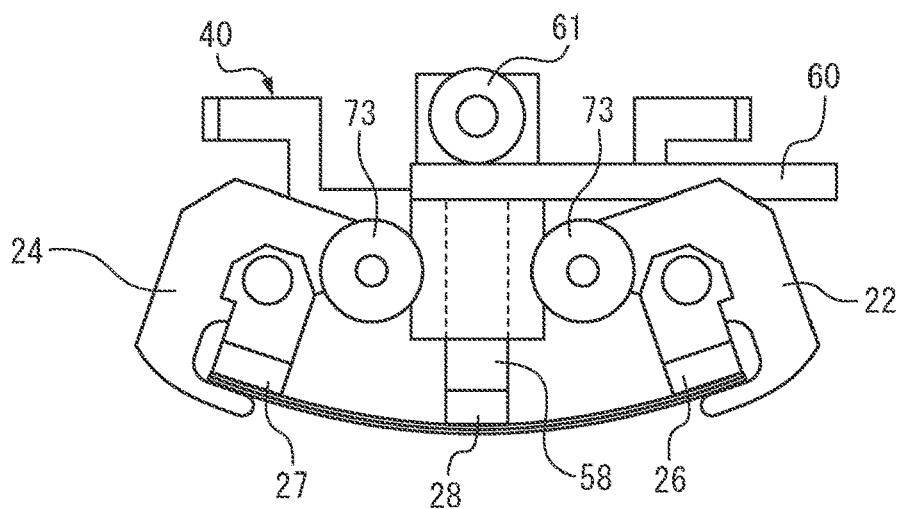

Next, a first embodiment of the conveyor plate support 19 shown from FIG. 8 to FIG. 11B will be explained. FIG. 8 and FIG. 9 are perspective views of the back surface of the conveyor plate support 19, that is, the perspective view of the conveyor plate support 19 when the mover 12 reaches the bottom end of the semicircular shape rail parts 10b of the plate conveyance device A and the conveyor plate 20 is made to turn upside down. Note that, FIG. 8 shows the conveyor plate support 19 before the work of stacking the sheet-shaped electrodes 1 on the stacking jig 80 is started and when the sheet-shaped electrodes 1 are conveyed toward the stacking part, while FIG. 9 shows the conveyor plate support 19 when the work of stacking the sheet-shaped electrodes 1 in the stacking jig 80 is being performed. Further, FIG. 10A shows a side view of the conveyor plate support 19 seen along the arrow X of FIG. 8 when the conveyor plate support 19 is in the state shown in FIG. 8, while FIG. 11A shows a cross-sectional view of the conveyor plate support 19 seen along the arrow Y of FIG. 8 when the conveyor plate support 19 is in the state shown in FIG. 8.

First, while referring to FIG. 8, FIG. 10A, and FIG. 11A, the structure of the first embodiment of the conveyor plate support 19 will be explained. If referring to FIG. 8, FIG. 10A, and FIG. 11A, the conveyor plate support 19 is provided with a base 40 supporting the conveyor plate support 19 as a whole. This base 40 has a flat top part 40a and a pair of mounting flange parts 40b formed at the two sides of the flat top part 40a. These pair of mounting flange parts 40b are fixed to the top part of the mover 12. Therefore, the conveyor plate support 19 is attached to the top part of the mover 12 through the base 40.

The conveyor plate 20 has a rectangular contour shape. As shown in FIG. 8, FIG. 10A, and FIG. 11A, on the back surface of the conveyor plate 20, a pair of end support rods 26, 27 extending along the two side edge parts of the conveyor plate 20 in the longitudinal direction of the conveyor plate 20 over the entire length of the conveyor plate 20 are fixed. Furthermore, on the back surface of the conveyor plate 20, a center support rod 28 is fixed extending at the center part of the conveyor plate 20 between the two side edge parts of the conveyor plate 20 in the same direction as the end support rods 26, 27, that is, in the longitudinal direction of the conveyor plate 20, over the entire length of the conveyor plate 20.

As shown in FIG. 8, a pair of biasing mechanisms 41 supporting the conveyor plate 20 and arranged in parallel so as to bias the two side edge parts of the conveyor plate 20 in directions away from each other are mounted on the base 40. The biasing mechanisms 41, as shown in FIG. 8 and FIG. 11A, respectively are provided with conveyor plate support beams 42 fixed to the outside surface of the flat top part 40a of the base 40 and extending in the short direction of the conveyor plate 20. The conveyor plate support beams 42 are provided with swing arms 45, 46 mounted at the two ends of the conveyor plate support beams 42 to be able to pivot by pivot shafts 43, 44. The bottom ends of these swing arms 45, 46 are connected to fixing pieces 47 (FIG. 8) fixed to the respectively corresponding end support rods 26, 27 to be able to pivot by the pivot shafts 48, 49.

On the other hand, compression springs 52, 53 pressing pressing pins 50, 51 seated in semispherical recesses on the inside surfaces of the swing arms 45, 46 toward the outside are inserted between the conveyor plate support beams 42 and the swing arms 45, 46. Therefore, the two ends of the conveyor plate 20 are biased by the spring forces of the compression springs 52, 53 constantly toward the outside direction in directions away from each other. In this way, due to the compression springs 52, 53, tensile forces directed to the outside direction act on the two ends of the conveyor plate 20, at all times, so the conveyor plate 20 usually, as shown in FIG. 8 and FIG. 11A, is held in a flat state. That is, the conveyor plate 20, as shown in FIG. 1, is made to move in a flat state along the horizontal straight parts 10a of the plate conveyance device A. Next, the conveyor plate 20 heads in a flat state along the semicircular rail part 10b toward the stacking part while turning the conveyor plate 20 upside down.

Now, in the stacking part, when stacking a new sheet-shaped electrode 1 carried on the conveyor plate 20 to the stacking jig 80, it is necessary to stack the new sheet-shaped electrode 1 carried on the conveyor plate 20 onto the sheet-shaped electrodes already stacked inside the stacking jig 80 so that the new sheet-shaped electrode 1 carried on the conveyor plate 20 is accurately aligned with the sheet-shaped electrodes already stacked inside the stacking jig 80. That is, when stacking the new sheet-shaped electrode 1 carried on the conveyor plate 20 to the stacking jig 80, the new sheet-shaped electrode 1 carried on the conveyor plate 20 has to be stacked on the sheet-shaped electrodes already stacked inside the stacking jig 80 so as not to be offset from the sheet-shaped electrodes already stacked inside the stacking jig 80.

Therefore, in the embodiment according to the present invention, when stacking the new sheet-shaped electrode 1 carried on the conveyor plate 20 onto the sheet-shaped electrode already stacked inside the stacking jig 80, the new sheet-shaped electrode 1 carried on the conveyor plate 20 is made to curve so that the center part of the new sheet-shaped electrode 1 sticks out toward the stacking jig 80, the front end part of the new sheet-shaped electrode 1 carried on the conveyor plate 20 sticking out is pressed against the sheet-shaped electrodes already stacked inside the stacking jig 80, a state is created where the new sheet-shaped electrode 1 carried on the conveyor plate 20 is not offset from the sheet-shaped electrodes already stacked inside the stacking jig 80, and, while maintaining this state, the work of stacking the new sheet-shaped electrode 1 to the stacking jig 80 is performed.

In the embodiment according to the present invention, in order to make the new sheet-shaped electrode 1 carried on the conveyor plate 20 curve so that the center part of the new sheet-shaped electrode 1 sticks out toward the stacking jig 80 when stacking the new sheet-shaped electrode 1 carried on the conveyor plate 20 onto the sheet-shaped electrodes already stacked inside the stacking jig 80, a pressing mechanism 55 for pressing the center part of the conveyor plate 20 positioned between the two side edge parts of the conveyor plate 20 in a direction vertical to the surface of the conveyor plate 20 to make the conveyor plate 20 deform from a flat state to a curved state is provided in the conveyor plate support 19.

Next, while referring to FIG. 8 and FIG. 10A, this pressing mechanism 55 will be explained. As shown in FIG. 8 and FIG. 10A, this pressing mechanism 55 is provided with a pair of hollow cylindrically shaped rod guides 56, 57 fit inside the flat top part 40a of the base 40 and spaced from each other in the longitudinal direction of the conveyor plate 20, rods 58, 59 inserted into the rod guides 56, 57 to be able to slide, a U-shaped connecting arm 60 coupled with one ends of these rods 58, 59, and rollers 61, 62 attached to the two ends of the connecting arm 60 to be able to rotate. The other ends of the rods 58, 59 are coupled to the center support rod 28 fixed on the back surface of the conveyor plate 20.

Figure 11A:
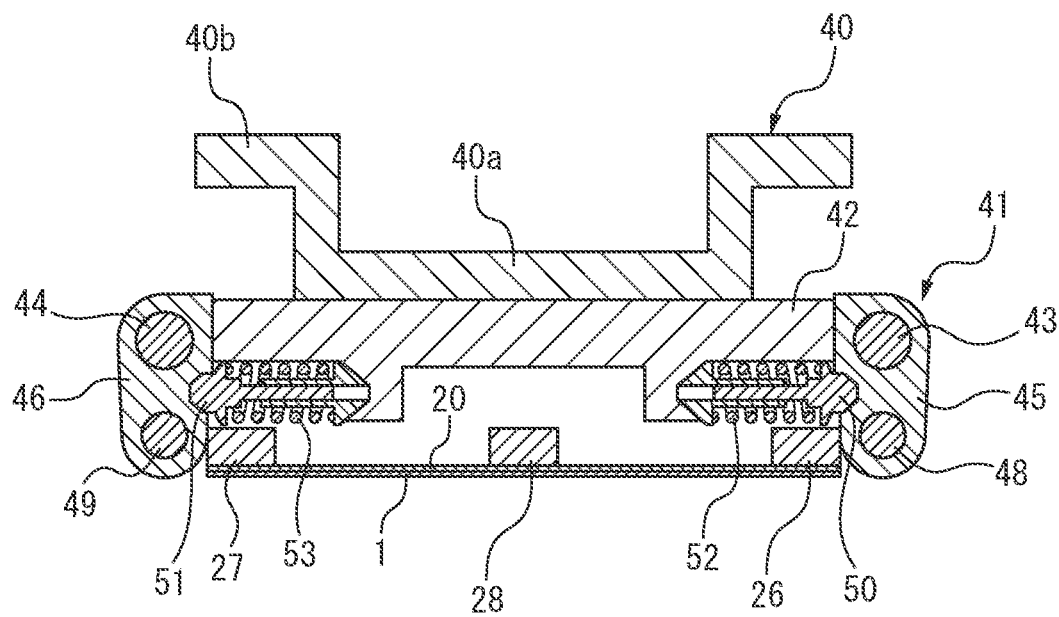
FIG. 11A and FIG. 11B are side cross-sectional views of a conveyor plate support seen along the arrow Y in FIG. 8 and FIG. 9.
Figure 11B:
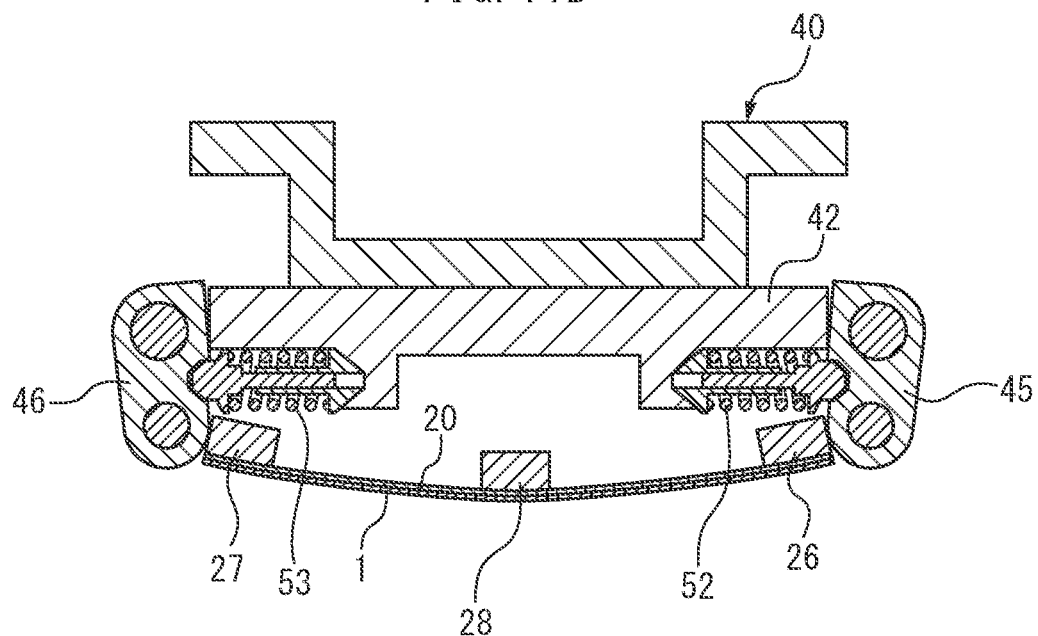

In FIG. 8, if the connecting arm 60 is pushed downward, the rods 58, 59 are pushed downward. If the rods 58, 59 are pushed downward, the center support rod 28 fixed on the back surface of the conveyor plate 20 is pushed downward. The state of the conveyor plate 20 at this time is shown in FIG. 9, FIG. 10B, and FIG. 11B. That is, as shown in FIG. 8 and FIG. 11A, the end support rods 26, 27 fixed at the two ends of the conveyor plate 20 are coupled with the swing arms 45, 46, so if the rods 58, 59 are pushed downward from the state shown in FIG. 10A, as shown in FIG. 10B and FIG. 11B, the conveyor plate 20 is deformed from a flat state to a curved state. At this time, to shorten the distance between the end support rods 26, 27, the swing arm 45 pivots somewhat in the clockwise direction at FIG. 11A and FIG. 11B against the spring force of the compression spring 52, while the swing arm 46 pivots somewhat in the counterclockwise direction at FIG. 11A and FIG. 11B against the spring force of the compression spring 53.

In this way, if the rods 58, 59 are pushed downward, the conveyor plate 20 is deformed from a flat state to a curved state against the spring forces of the compression springs 52, 53. Therefore, if the pushed down rods 58, 59 are made to rise, the conveyor plate 20 is returned from the curved state to the flat state by the spring forces of the compression springs 52, 53. The pushing action and rising action of the rods 58, 59 are performed by the rollers 61, 62 engaging with a fixed cam when the mover 12 is made to move along the rail 10. Therefore, in the embodiment according to the present invention, along with movement of the mover 12 along the rail 10, the action of deformation from a flat state of the conveyor plate 20 to a curved state and the action of deformation from a curved state to a flat state are performed.

Next, the clamp mechanism 25 for holding the sheet-shaped electrode 1 carried on the conveyor plate 20 against the conveyor plate 20 will be explained. Referring to FIG. 5, as explained above, in the embodiment according to the present invention, this clamp mechanism 25 is comprised of a plurality of the clamps 21, 22, 23, 24. These clamps 21, 22, 23, 24 have the same L-shapes. As shown in FIG. 8 and FIG. 10A, the clamps 21, 22, 23, 24 have pressing parts 70 extending up to the surface of the conveyor plate 20. Pairs of brackets 71 arranged at distances from each other are fixed on the end support rods 26, 27. The center parts of the clamps 21, 22, 23, 24 are attached to the pivot shafts 72 supported by the brackets 71 so as to be able to pivot. Further, rollers 73 are attached to the ends of the clamps 21, 22, 23, 24 positioned at the opposite side from the pressing parts 70 so as to be able to rotate.

As will be understood from FIG. 8 and FIG. 10A, the clamps 21, 22 and the clamps 23, 24 are arranged symmetrically about the longitudinal axis of the conveyor plate 20. On the pivot shafts 72 of the clamps 21, 22, coil springs biasing the clamps 21, 22 clockwise in FIG. 10A are attached. Due to the spring forces of the coil springs, the pressing parts 70 of the clamps 21, 22 press the peripheral parts of the sheet-shaped electrode 1 carried on the conveyor plate 20 against the conveyor plate 20. Similarly, on the pivot shafts 72 of the clamps 23, 24, coil springs biasing the clamps 23, 24 counterclockwise in FIG. 10A are attached. Due to the spring forces of the coil springs, the pressing parts 70 of the clamps 23, 24 press the peripheral parts of the sheet-shaped electrode 1 carried on the conveyor plate 20 against the conveyor plate 20.

As explained above, if the connecting arm 60 is pushed downward, as shown in FIG. 10B and FIG. 11B, the conveyor plate 20 is deformed from a flat state to a curved state. If the conveyor plate 20 is made to deform from a flat state to a curved state, the end support rods 26, 27 change from a horizontal state shown in FIG. 10A and FIG. 11A to a tilted state shown in FIG. 10B and FIG. 11B. If the end support rods 26, 27 change from a horizontal state to a tilted state, the clamps 21, 22, 23, 24 also become a tilted state together with the end support rods 26, 27 while holding the state where the pressing parts 70 press the peripheral parts of the sheet-shaped electrode 1 carried on the conveyor plate 20 against the conveyor plate 20. Therefore, even when the conveyor plate 20 is made to deform from a flat state to a curved state, the sheet-shaped electrode 1 carried on the conveyor plate 20 continues to be pressed against the conveyor plate 20 by the pressing parts 70 of the clamps 21, 22, 23, 24.

Figure 10C:
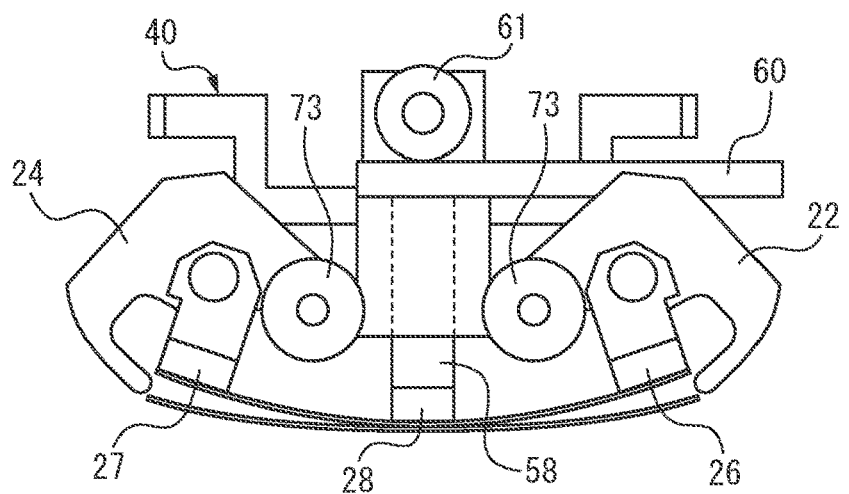

On the other hand, when releasing the action of pressing the sheet-shaped electrode 1 on the conveyor plate 20 by the pressing parts 70 of the clamps 21, 22, 23, 24, as shown in FIG. 10C, the clamp 22 is made to pivot counterclockwise against the spring forces of the coil springs while the clamp 24 is made to pivot clockwise against the spring forces of the coil springs. At this time, while not shown in FIG. 10C, the clamp 21 is also made to pivot counterclockwise against the spring forces of the coil springs, while the clamp 23 is also made to pivot clockwise against the spring forces of the coil springs. The pivoting work of these clamps 21, 22, 23, 24 is performed by the roller 73 engaging with the fixed cam when the mover 12 is made to move along the rail 10.

Figure 12:
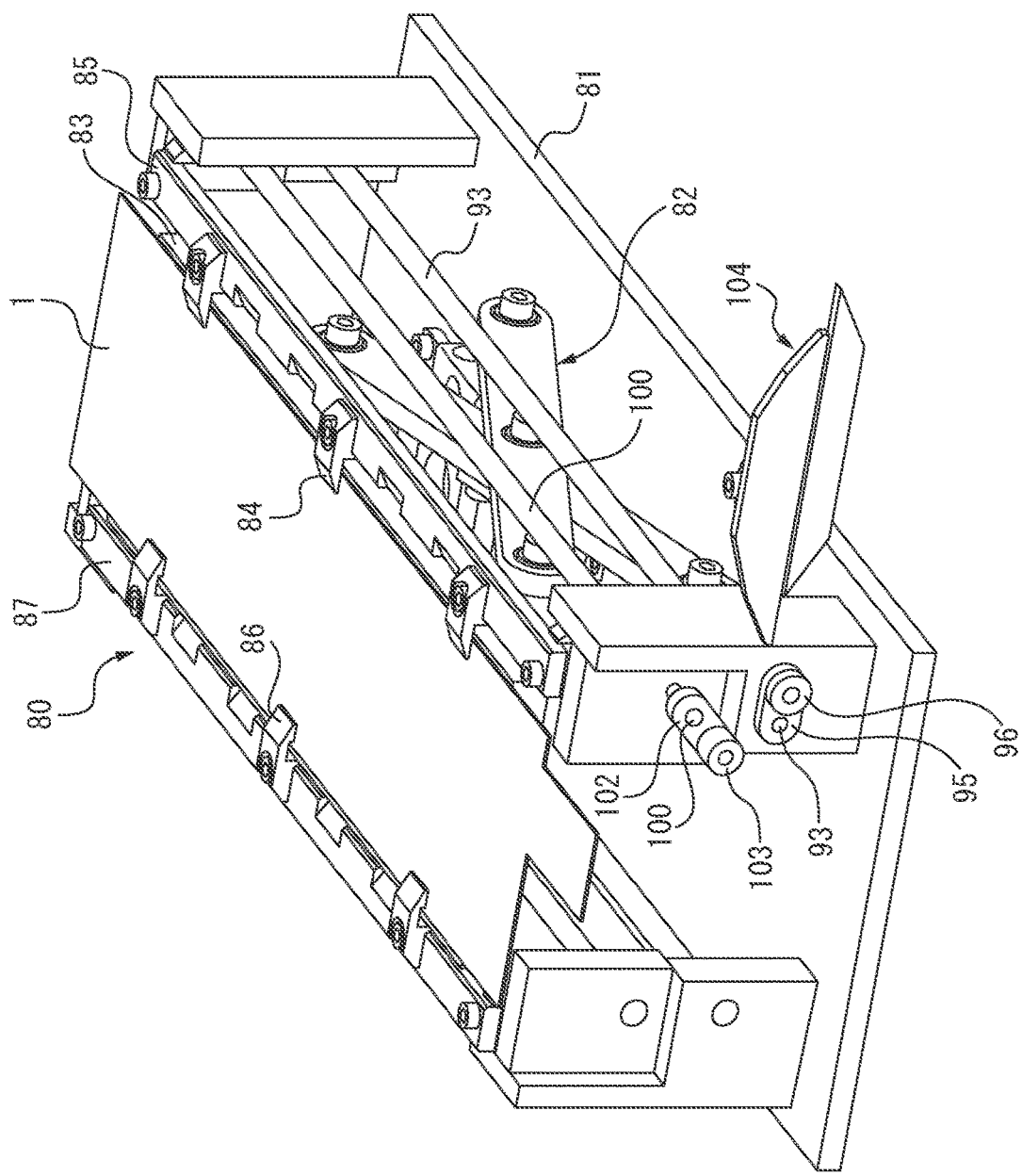
FIG. 12 is a perspective view schematically showing a stacking jig.

Next, referring to FIG. 12, the stacking jig 80 will be explained. This FIG. 12 shows a perspective view of the stacking jig 80 shown schematically. Referring to FIG. 12, the stacking jig 80 is provided with a base 81, a pantograph type elevator mechanism 82 attached on the base 81, a bottom plate 83 supported by this pantograph type elevator mechanism 82, a clamp rod 85 provided at one side of the bottom plate 83 and having three clamps 84, and a clamp rod 87 provided at the other side of the bottom plate 83 and having three clamps 86. The bottom plate 43 is constantly biased upward by the spring-biased pantograph type elevator mechanism 82.

Figure 13A:
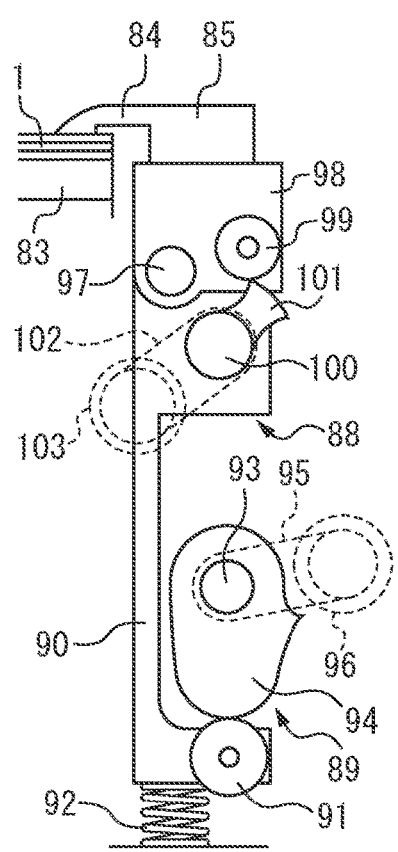
FIG. 13A, FIG. 13B, and FIG. 13C are views for explaining the operation of a clamp mechanism of a stacking jig.
Figure 13B:
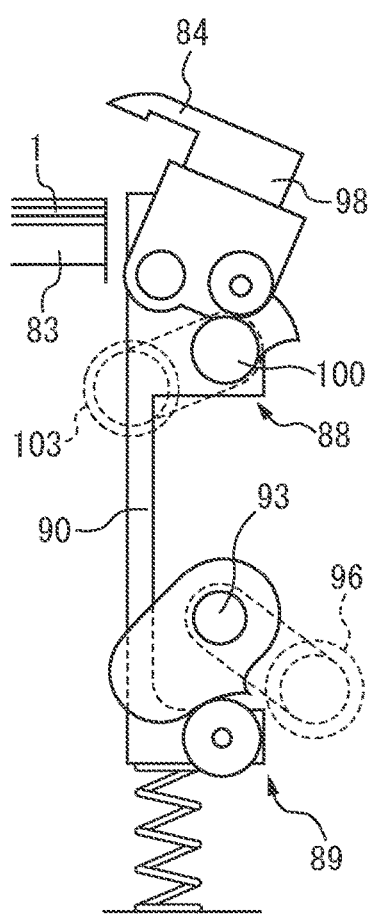
Figure 13C:
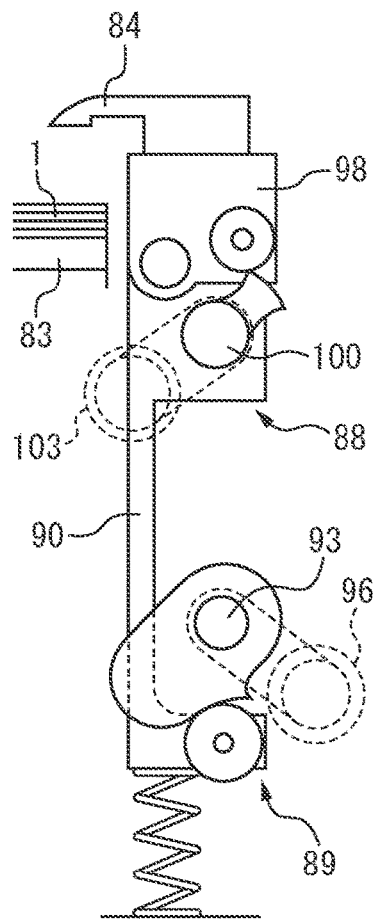

On the other hand, the clamp rod 85 and the clamp rod 87 have symmetrical shapes relative to the longitudinal axis of the bottom plate 83. The clamp mechanism for operating these clamp rod 85 and clamp rod 87 also has a symmetrical structure relative to the longitudinal axis of the bottom plate 83. Therefore, below, referring to FIG. 12 and FIG. 13A to FIG. 13C, only the structures of the clamp rod 85 and the clamp mechanism for operating the clamp rod 85 will be explained, while the explanation of the structures of the clamp rod 87 and the clamp mechanism for operating the clamp rod 87 will be omitted. Note that, FIG. 13A to FIG. 13C schematically show the operation of the clamp mechanism for operating the clamp rod 85. These FIG. 13A to FIG. 13C sketch part of the bottom plate 83 and parts of the plurality of sheet-shaped electrodes 1 stacked on the bottom plate 83.

If referring to FIG. 13A, the clamp mechanism of the stacking jig 80 has a tilt mechanism 88 for making the clamp rod 85 of the clamp 84 tilt and a slide mechanism 89 for making the tilt mechanism 88 move up and down. The slide mechanism 89 is provided with a slider 90 supported inside the stacking jig 80 to be able to slide in the up-down direction, a roller 91 attached to the bottom end of the slider 90 to be able to rotate, a compression spring 92 biasing the slider 90 upward, a cam shaft 93 supported inside the stacking jig 80 to be able to turn, a cam 94 fixed to the cam shaft 93 and engaging with the roller 91, an arm 95 fixed to the outer end of the cam shaft 93, and a roller 96 attached to the front end of the arm 95 to be able to rotate. In FIG. 13A, if the cam shaft 93 is made to turn clockwise, as shown in FIG. 13B, the slider 90 rises due to the spring force of the compression spring 92. That is, in the slide mechanism 89, by making the cam shaft 93 turn, the slider 90 is made to move up and down.

On the other hand, the tilt mechanism 88 is provided with a tilt head 98 supporting the clamp rod 85 and attached to the slider 90 to be able to turn by a pivot shaft 97, a roller 99 attached to the tilt head 98 to be able to rotate, a cam shaft 100 supported at the slider 90 to be able to turn, a cam 101 fixed to the cam shaft 100 and engaging with the roller 99, an arm 102 fixed to an outer end of the cam shaft 100, and a roller 103 attached to the front end of the arm 102 to be able to rotate. Note that, the position of the tilt head 98 when the clamp 84 is positioned above the sheet-shaped electrode 1 carried on the conveyor plate 20 as shown in FIG. 13A or FIG. 13C will hereinafter be called the "upright position". On the other hand, if in FIG. 13A the cam shaft 100 is made to turn clockwise, as shown in FIG. 13B, the tilt head 98 is tilted in a direction in which the clamp 84 leaves the region above the sheet-shaped electrode 1 carried on the conveyor plate 20.

FIG. 13A shows when the tilt head 98 is in the upright position and the sheet-shaped electrodes 1 stacked on the bottom plate 83 are pressed down by the clamp 84. That is, at this time, the sheet-shaped electrodes 1 stacked on the bottom plate 83 are biased upward by the pantograph type elevator mechanism 82. At this time, the sheet-shaped electrodes 1 trying to rise are pressed down by the clamp 84. When releasing the action of pressing down the sheet-shaped electrodes 1 stacked on the bottom plate 83 by the clamp 84, the cam shaft 93 and the cam shaft 100 are both turned clockwise (at this time, the sheet-shaped electrodes 1 stacked on the bottom plate 83 are pressed downward). Due to this, as shown in FIG. 13B, the tilt head 98 is made to rise and the tilt head 98 is tilted in a direction where the clamp 84 leaves the region above the sheet-shaped electrodes 1 stacked on the bottom plate 83. (At this time, the new sheet-shaped electrode 1 is stacked on the sheet-shaped electrodes 1 stacked on the bottom plate 83). Next, as shown in FIG. 13C, the tilt head 98 is returned to the upright position, then the tilt head 98 is made to descend, whereby the sheet-shaped electrodes 1 stacked on the bottom plate 83 are pressed down by the clamp 84. The work of turning the cam shaft 93 and the cam shaft 100 is performed by the roller 96 and the roller 103 engaging with the fixed cam 104 shown in FIG. 12 when the mover 12 is made to move along the rail 10.

Figure 14A:
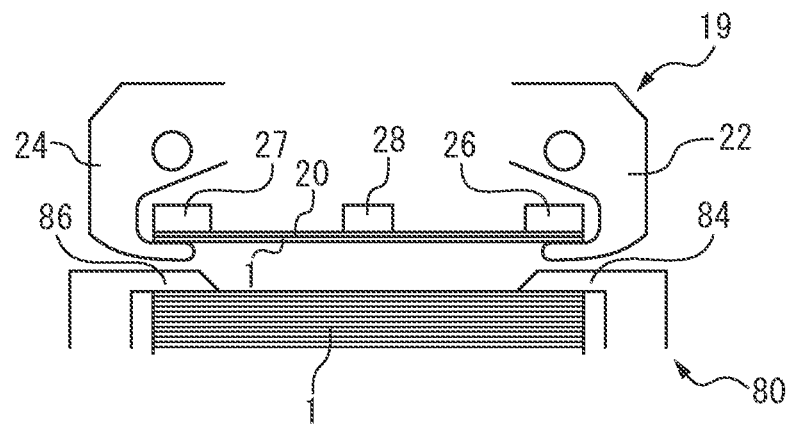
FIG. 14A, FIG. 14B, and FIG. 14C are views for explaining stacking work of sheet-shaped electrodes in the first embodiment.
Figure 14B:
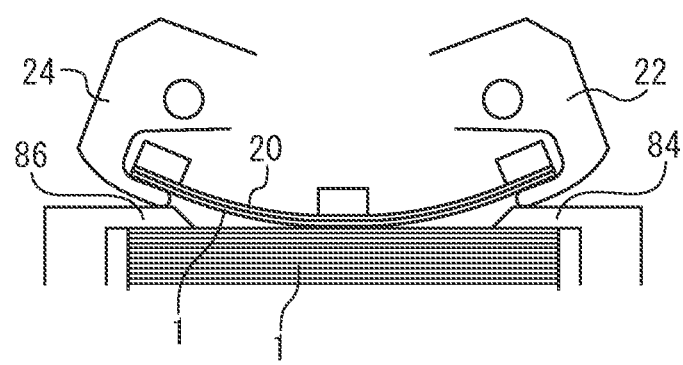

Next, referring to FIG. 14A to FIG. 15C, the method of stacking the sheet-shaped electrodes 1 in the first embodiment of the conveyor plate support 19 will be explained. Note that, this action of stacking the sheet-shaped electrodes 1 is performed while the conveyor plate support 19 and stacking jig 80 move synchronously with each other. FIG. 14A shows when the new sheet-shaped electrode 1 carried on the conveyor plate 20 of the conveyor plate support 19 is aligned with the sheet-shaped electrodes 1 stacked inside the stacking jig 80. If the new sheet-shaped electrode 1 carried on the conveyor plate 20 is aligned with the sheet-shaped electrodes 1 stacked inside the stacking jig 80, the pressing mechanism 55 pushes the center support rod 28 of the conveyor plate 20 downward. As a result, as shown in FIG. 14B, the conveyor plate 20 is deformed from a flat state to a curved state and the center part of the new sheet-shaped electrode 1 carried on the conveyor plate 20 is pressed against the sheet-shaped electrodes 1 stacked inside the stacking jig 80.

Figure 14C:
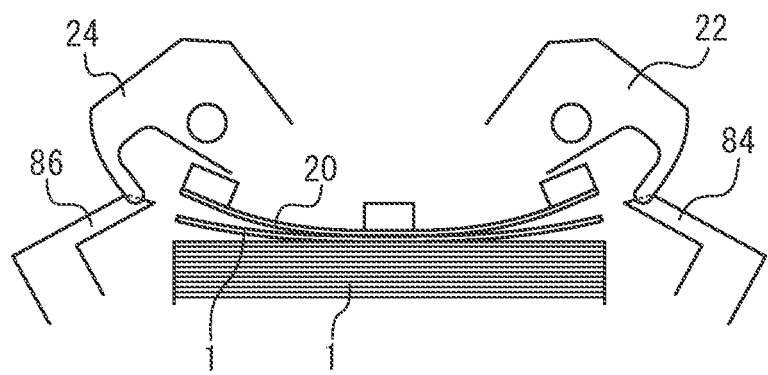
Figure 15A:
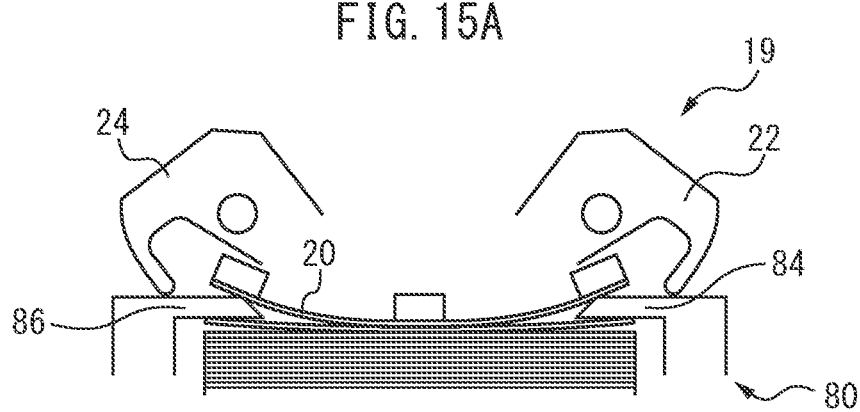
FIG. 15A, FIG. 15B, and FIG. 15C are views for explaining stacking work of sheet-shaped electrodes in the first embodiment.
Figure 15B:
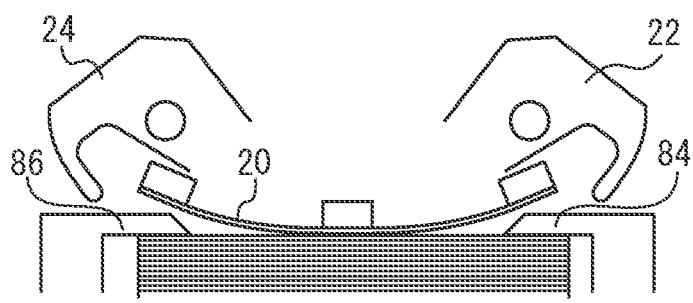

Next, as shown in FIG. 14C, in the state where the center part of the new sheet-shaped electrode 1 carried on the conveyor plate 20 is pressed against the sheet-shaped electrodes 1 stacked inside the stacking jig 80, the action of pressing down the sheet-shaped electrodes 1 inside the stacking jig 80 by the clamps 84, 86 is released and the action of pressing down the new sheet-shaped electrode by the clamps 22, 24 of the conveyor plate support 19 is released. Due to this, the two side parts of the new sheet-shaped electrode 1 drop down toward the sheet-shaped electrodes 1 stacked inside the stacking jig 80. If the two side parts of the new sheet-shaped electrode 1 drop down toward the sheet-shaped electrodes 1 stacked inside the stacking jig 80, the clamps 84, 86 of the stacking jig 80 are made upright states such as shown in FIG. 13C. This time is shown in FIG. 15A.

Figure 15C:
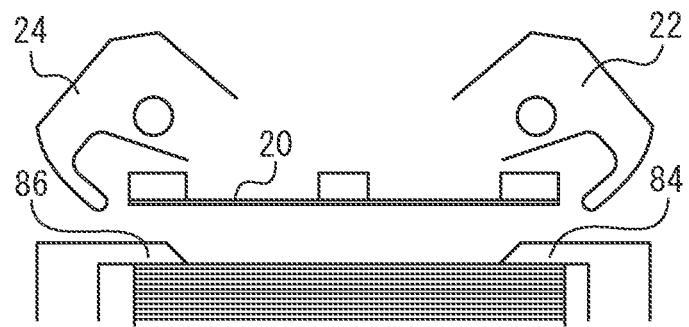

Next, the clamps 84, 86 of the stacking jig 80 are made to lower whereby the sheet-shaped electrodes 1 stacked inside the stacking jig 80 are pressed down by the clamps 84, 86. If the sheet-shaped electrodes 1 stacked inside the stacking jig 80 are pressed down by the clamps 84, 86, the action of pushing the center support rod 28 of the conveyor plate 20 downward by the pressing mechanism 55 is released. Due to this, the center support rod 28 of the conveyor plate 20 moves upward. As a result, as shown in FIG. 15C, the conveyor plate 20 is returned from the curved state to the flat state. Next, the conveyor plate support 19 is returned by the mover 12 to the placement position shown in FIG. 1.

Figure 16:
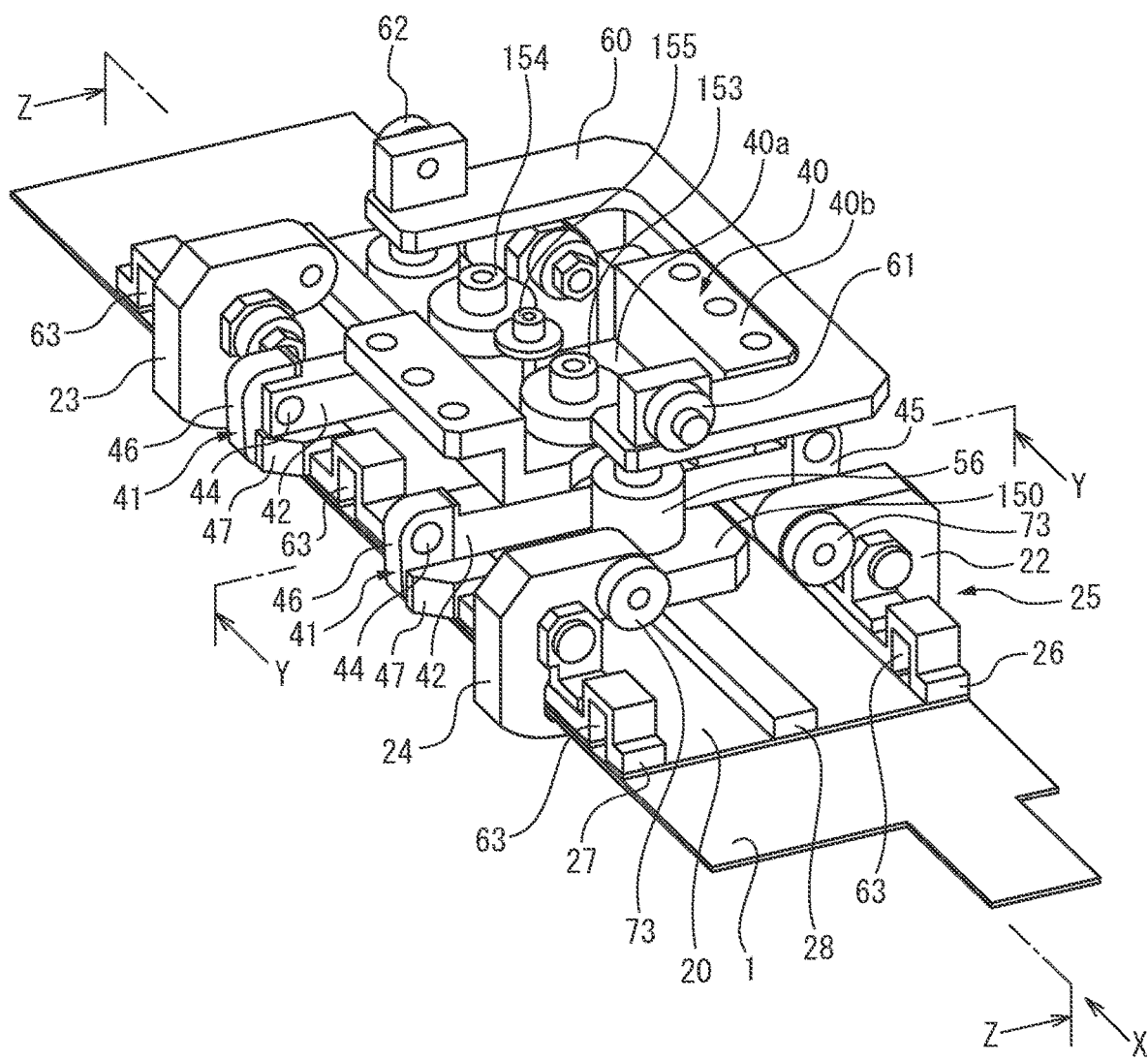
FIG. 16 is a view showing a back surface of a second embodiment of a conveyor plate support.
Figure 17:
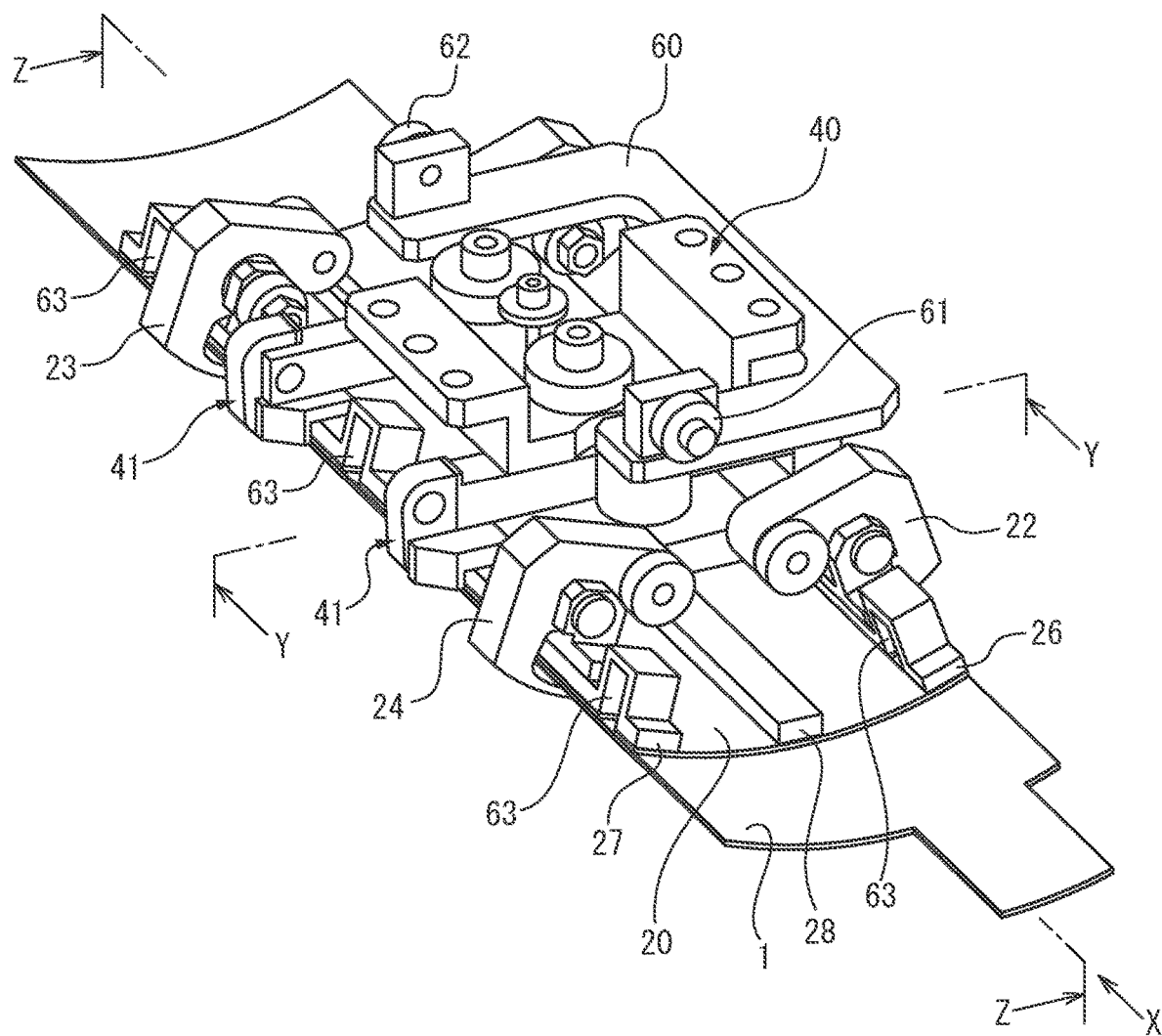
FIG. 17 is a view showing a back surface of the second embodiment of a conveyor plate support.
Figure 18A:
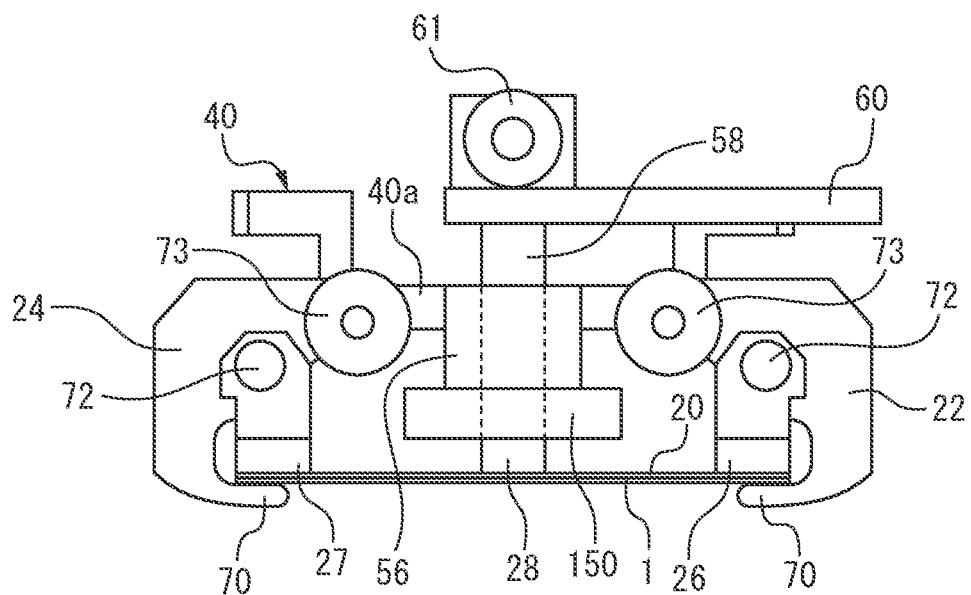
FIG. 18A and FIG. 18B are side views of a conveyor plate support seen along the arrow X in FIG. 16 and FIG. 17.
Figure 18B:
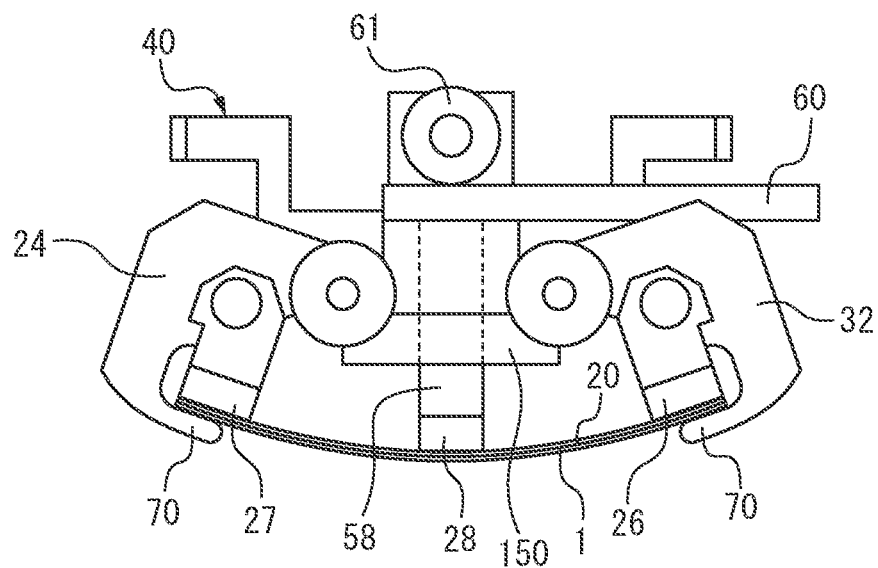
Figure 19A:
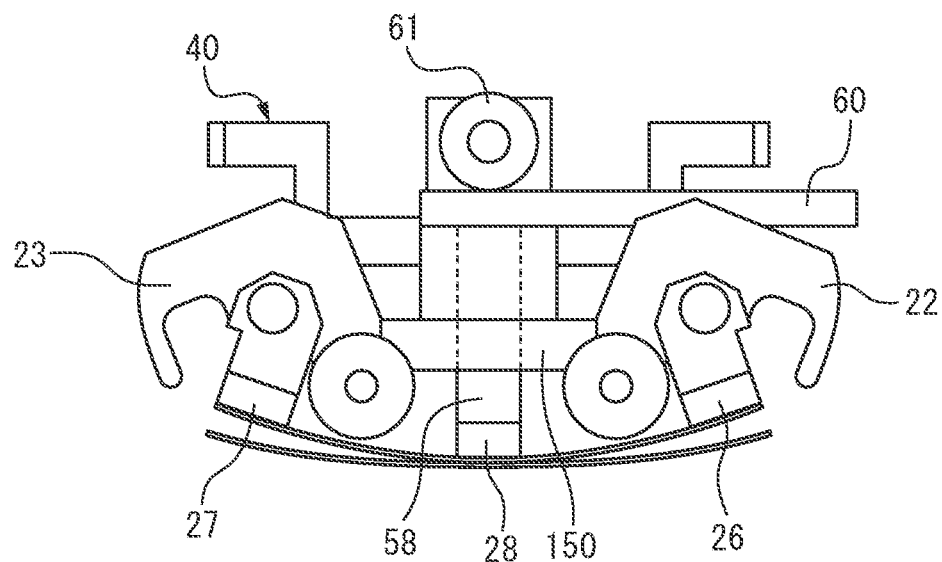
FIG. 19A and FIG. 19B are side views of a conveyor plate support seen along the arrow X in FIG. 16 and FIG. 17.
Figure 19B:
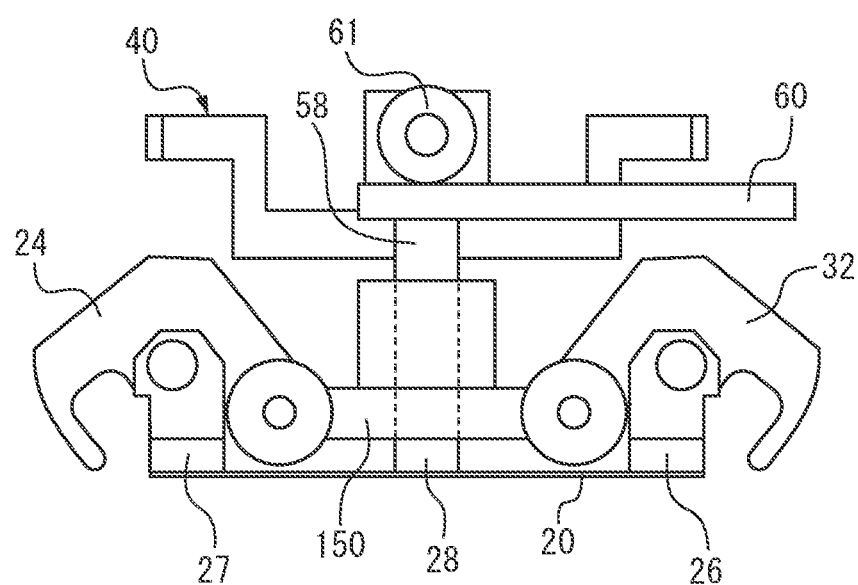
Figure 20A:
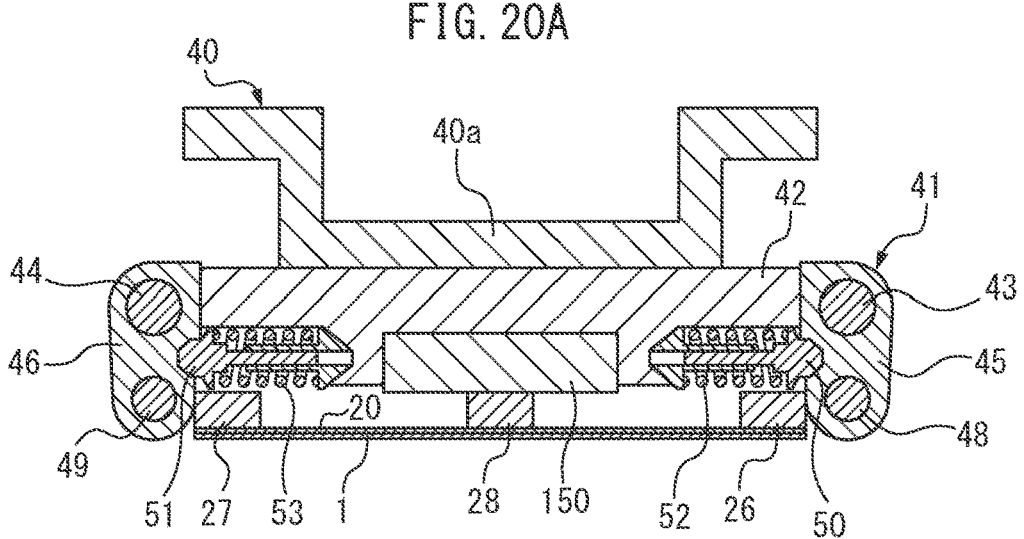
FIG. 20A, FIG. 20B, and FIG. 20C are side views of a conveyor plate support seen along the arrow Y in FIG. 16 and FIG. 17.
Figure 20B:
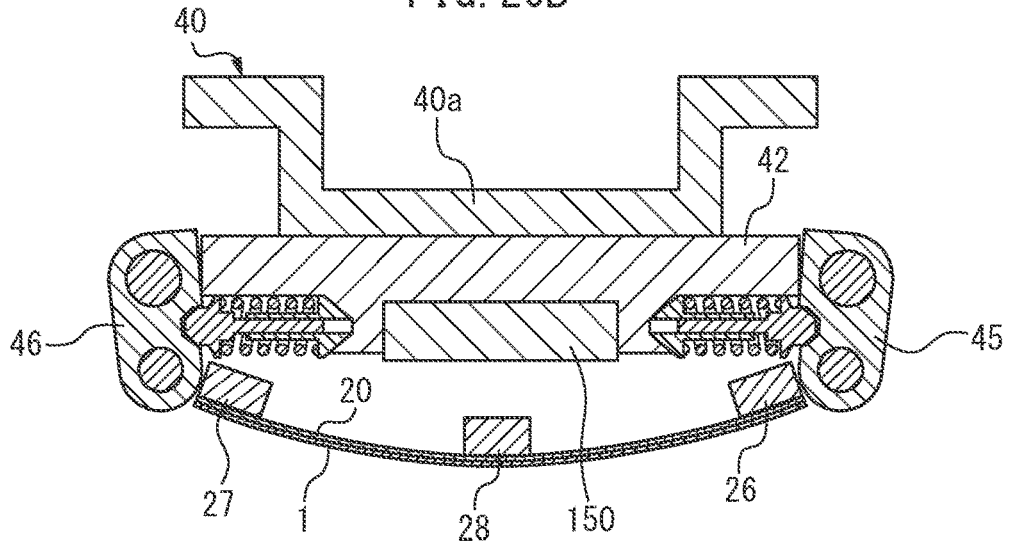
Figure 20C:
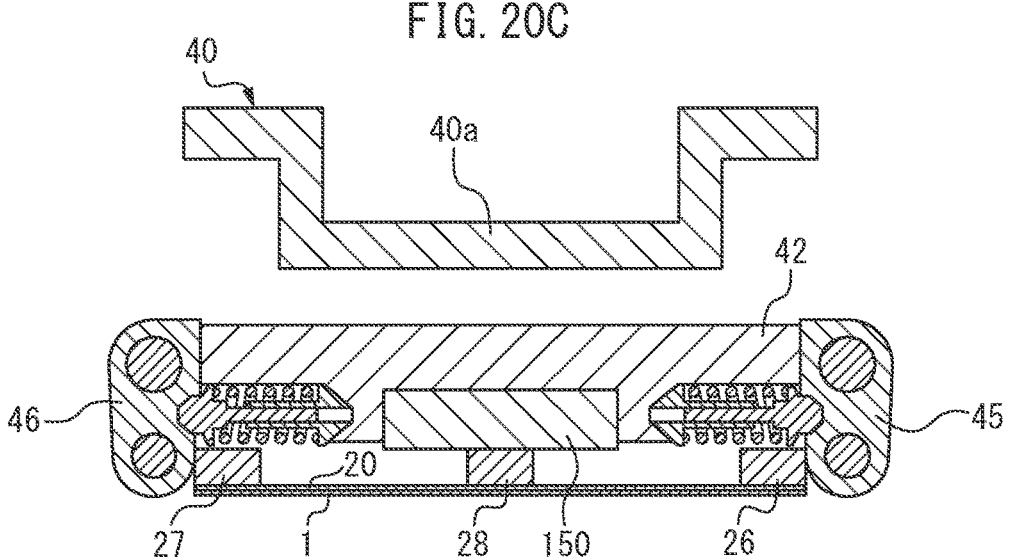
Figure 21A:
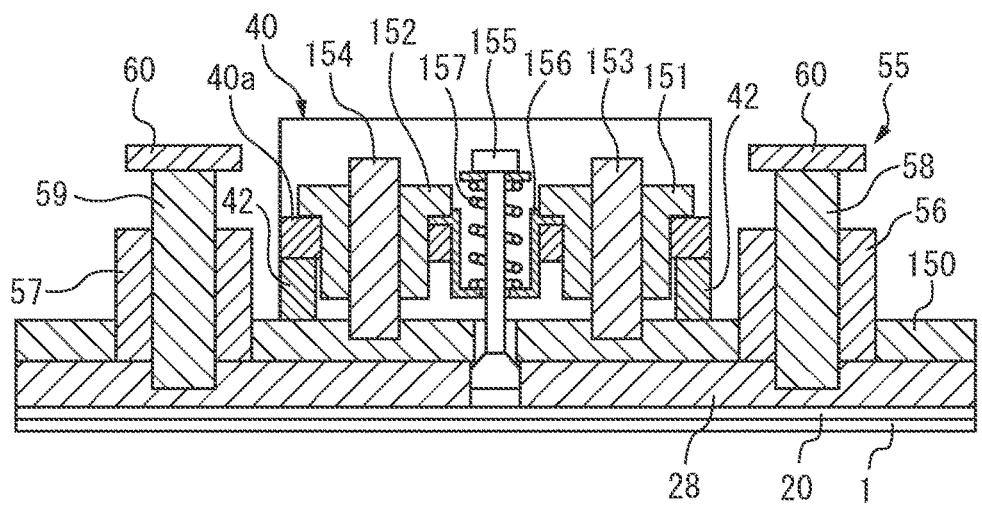
FIG. 21A, FIG. 21B, and FIG. 21C are cross-sectional views of a conveyor plate support seen along the arrow Z in FIG. 16 and FIG. 17.
Figure 21B:
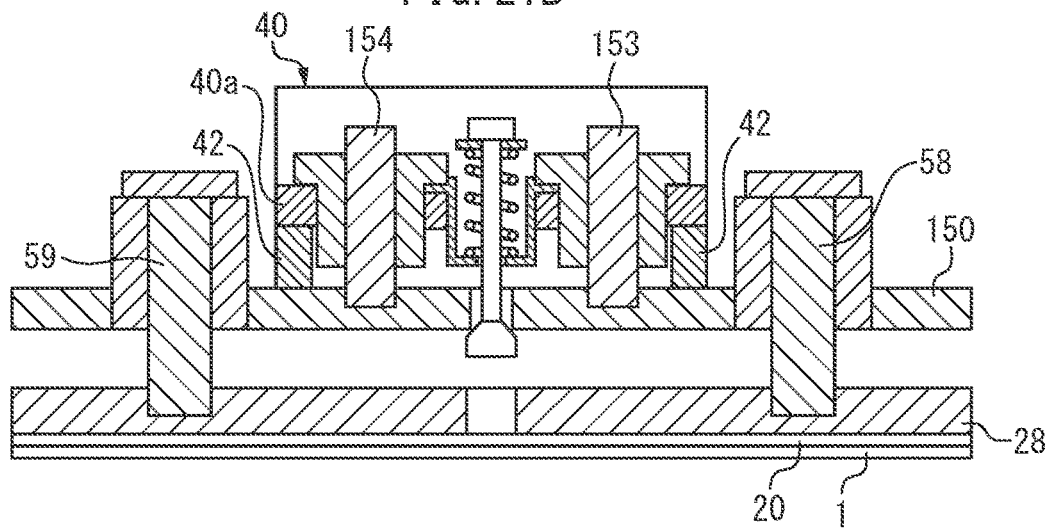
Figure 21C:
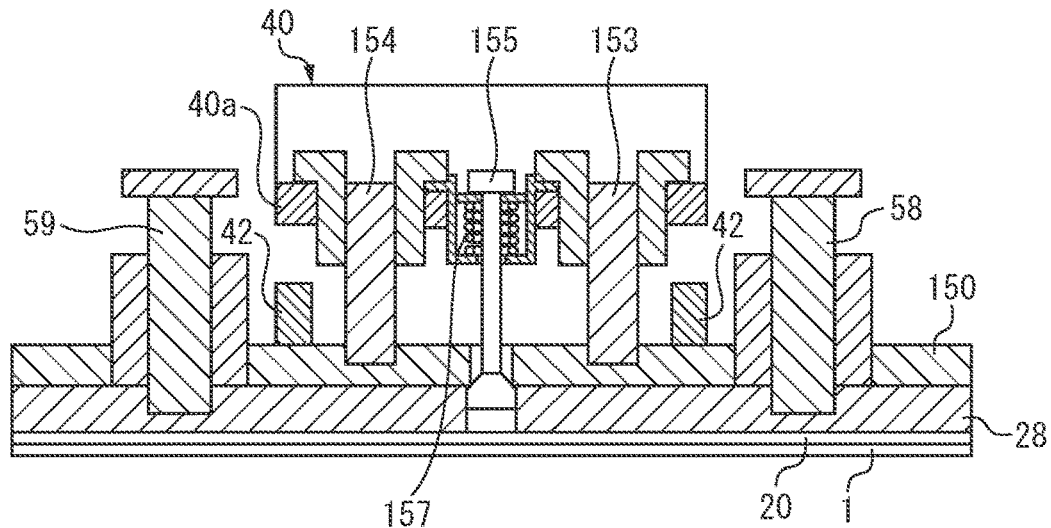

Next, a second embodiment of the conveyor plate support 19 shown in FIG. 16 to FIG. 24 will be explained. FIG. 16 and FIG. 17, like FIG. 8 and FIG. 9, are perspective views of the back surface of the conveyor plate support 19, that is, are perspective views of the conveyor plate support 19 when the mover 12 reaches the bottom end of the semicircular rail portion 10b of the plate conveyance device A and the conveyor plate 20 is inverted upside down. Note that, FIG. 16 shows the conveyor plate support 19 before the work of stacking the sheet-shaped electrodes 1 on the stacking jig 40 is started and when the sheet-shaped electrodes 1 are conveyed toward the stacking part, while FIG. 17 shows the conveyor plate support 19 when the work of stacking the sheet-shaped electrodes 1 on the stacking jig 40 is performed at the stacking part. Further, FIG. 18A shows a side view of the conveyor plate support 19 seen along the arrow X of FIG. 16 when the conveyor plate support 19 is in the state shown in FIG. 16, FIG. 20A shows a cross-sectional view of the conveyor plate support 19 seen along the arrow Y when the conveyor plate support 19 is in the state shown in FIG. 16, while FIG. 21A shows a cross-sectional view of the conveyor plate support 19 seen along the arrow Z of FIG. 16 when the conveyor plate support 19 is in the state shown in FIG. 16.

First, referring to FIG. 16, FIG. 18A, FIG. 20A, and FIG. 21A, the structure of the second embodiment of the conveyor plate support 19 will be explained. If referring to FIG. 16, FIG. 18A, FIG. 20A, and FIG. 21A, in this second embodiment as well, the conveyor plate support 19 is provided with a base 40 for supporting the conveyor plate support 19 as a whole. This base 40 has a flat top part 40a and a pair of mounting flange parts 40b formed at the two sides of the flat top part 40a. These pair of mounting flange parts 40b are fixed to the top part of the mover 12. Therefore, in this second embodiment as well, the conveyor plate support 19 is attached to the top part of the mover 12 through the base 40.

The difference between the first embodiment of the conveyor plate support 19 and the second embodiment of the conveyor plate support 19 is that, in the first embodiment, the conveyor plate support 19 as a whole is supported fixed on the base 40, while in the second embodiment, the conveyor plate support 19 as a whole is not supported fixed on the base 40, but the conveyor plate support 19 is supported on the base 40 so that the conveyor plate support 19 as a whole can separate from the base 40. In this case, in the second embodiment, the conveyor plate support 19 as a whole is supported fixed on the movable base plate 150. The movable base plate 150 is supported by the base 40 to be able to move so that the conveyor plate support 19 as a whole can separate from the base 40.

As explained later, the first embodiment and the second embodiment differ somewhat in stacking method. As opposed to this, the structure of the first embodiment of the conveyor plate support 19 and the structure of the second embodiment of the conveyor plate support 19 are almost the same, except for that in the first embodiment, the conveyor plate support 19 as a whole is supported fixed to the base 40 and in the second embodiment, the conveyor plate support 19 as a whole is supported fixed to the movable base plate 150. Therefore, the structure of the second embodiment of the conveyor plate support 19 will be simply explained. In the second embodiment, component elements similar to the component elements of the first embodiment are shown by the same notations as the first embodiment.

Now then, as shown in FIG. 16, FIG. 18A and FIG. 20A, in the second embodiment as well, a pair of the end support rods 26, 27 extending along the two side edge parts of the conveyor plate 20 in the longitudinal direction of the conveyor plate 20 over the entire length of the conveyor plate 20 are fixed on the back surface of the conveyor plate 20 having the rectangular shape. A center support rod 28 extending in the longitudinal direction of the conveyor plate 20 over the entire length of the conveyor plate 20 is fixed on the center part of the conveyor plate 20 between the two side edge parts of the conveyor plate 20. On the other hand, the movable base plate 150 supporting the conveyor plate support 19 is formed from a rectangular shape flat plate. This movable base plate 150, as shown in FIG. 16, FIG. 18A, FIG. 20A, and FIG. 21A, extends in parallel with the flat top part 40a of the base 40 separated by a distance from the flat top part 40a.

As shown in FIG. 16, a pair of biasing mechanisms 41 arranged aligned to support the conveyor plate 20 and bias the two side edge parts of the conveyor plate 20 in directions away from each other are attached on the back surface of this movable base plate 150. The biasing mechanisms 41, as shown in FIG. 16 and FIG. 20A, are provided with conveyor plate support beams 42 fixed on the back surface of the movable base plate 150 and extending in the short direction of the conveyor plate 20. The conveyor plate support beams 42, in the same way as the first embodiment, are provided with swing arms 45, 46 attached to the two ends of the conveyor plate support beams 42 to be able to pivot by the respective pivot shafts 43, 44. The bottom ends of these swing arms 45, 46 are coupled to the fixing pieces 47 (FIG. 16) fixed to the respectively corresponding end support rods 26, 27 to be able to pivot by the pivot shafts 48, 49.

On the other hand, in the same way as the first embodiment, compression springs 52, 53 pushing the push pins 50, 51 seated in the semispherical shaped recesses at the inside surfaces of the swing arms 45, 46 to the outside are inserted between the conveyor plate support beams 42 and the swing arms 45, 46. Therefore, the two ends of the conveyor plate 20 are biased by the spring forces of the compression springs 52, 53 at all times toward the outside direction in directions away from each other. On the other hand, as shown in FIG. 16 and FIG. 21A, at the flat top part 40a of the base 40, a pair of hollow cylindrically shaped rod guides 151, 152 are fit separated by a distance. Inside these rod guides 151, 152, the guide rods 153, 154 are inserted to be able to slide. As shown in FIG. 21A, the bottom ends of the guide rods 153, 154 are fixed to the movable base plate 150. Therefore, the movable base plate 150 is guided by the guide rods 153, 154 while being able to move up and down with respect to the base 40.

As shown in FIG. 16 and FIG. 21A, an anchor rod 155 extending through the movable base plate 150 and the flat top part 40a of the base 40 is provided between the guide rods 153, 154. The bottom end of this anchor rod 155 is fixed hung on the movable base plate 150. Between the top end of this anchor rod 155 and the spring support sleeve 156 fit with the flat top part 40a of the base 40, a compression spring 157 is inserted. As shown in FIG. 21A, the movable base plate 150 is usually made to sit on the flat top part 40a of the base 40 through the conveyor plate support beam 42 fixed on the movable base plate 150 by the spring force of the compression spring 157. That is, the movable base plate 150 is usually joined to the base 40. Therefore, the conveyor plate support 19 is usually joined to the base 40.

On the other hand, in the second embodiment as well, in order to make the new sheet-shaped electrode 1 carried on the conveyor plate 20 curve so that the center part of the new sheet-shaped electrode 1 sticks out toward the stacking jig 80 when stacking the new sheet-shaped electrode 1 carried on a conveyor plate 20 on the sheet-shaped electrodes already stacked inside the stacking jig 80, a pressing mechanism 55 for pressing the center part of the conveyor plate 20 positioned between the two side edge parts of the conveyor plate 20 in a direction vertical to the surface of the conveyor plate 20 to make the conveyor plate 20 deform from a flat state to a curved state is provided inside the conveyor plate support 19.

This pressing mechanism 55, as shown in FIG. 16, FIG. 18A, and FIG. 21A, is provided with a pair of hollow cylindrically shaped rod guides 56, 57 separated by a distance in the longitudinal direction of the conveyor plate 20 and fit inside the movable base plate 150, rods 58, 59 inserted inside the rod guides 56, 57 to be able to slide, a U-shaped connecting arm 60 coupled with single ends of these rods 58, 59, and rollers 61, 62 attached to the two ends of the connecting arm 60 to be able to rotate. The other ends of the rods 58, 59 are connected to the center support rod 28 fixed on the back surface of the conveyor plate 20. Note that, in FIG. 21A to FIG. 21C, the rollers 61, 62 are omitted.

In FIG. 16, if the connecting arm 60 is pushed downward, in the same way as the first embodiment, the rods 58, 59 are pushed downward. If the rods 58, 59 are pushed downward, the center support rod 28 fixed on the back surface of the conveyor plate 20 is pushed downward. In this way, if the rods 58, 59 are pushed downward, the conveyor plate 20 is deformed from a flat state to a curved state against the spring forces of the compression spring 52, 53. The state of the conveyor plate 20 at this time is shown in FIG. 17, FIG. 18B, FIG. 20B, and FIG. 21B. On the other hand, if the pushed down rods 58, 59 are made to rise, the conveyor plate 20 returns from the curved state to the flat state due to the spring forces of the compression springs 52, 53. This action of pushing down the rods 58, 59 and work of raising them, in the same way as the first embodiment, are performed by the rollers 61, 62 engaging with the fixed cam when the mover 12 is made to move along the rail 10.

On the other hand, in the second embodiment as well, to hold the sheet-shaped electrodes 1 carried on the conveyor plate 20 against the conveyor plate 20, a clamp mechanism 25 comprised of clamps 21, 22, 23, 24 having the same structures and the same functions as the first embodiment is used. Therefore, in the second embodiment as well, in the same way as the first embodiment, as shown in FIG. 16, FIG. 17, FIG. 18A, and FIG. 18B, due to the spring forces of the coil springs, the pressing parts 70 of the clamps 21, 22, 23, 24 press the peripheral parts of the sheet-shaped electrodes 1 carried on the conveyor plate 20 against the conveyor plate 20. On the other hand, when the action of pressing the sheet-shaped electrodes 1 on the conveyor plate 20 by the pressing parts 70 of the clamps 21, 22, 23, 24 is released, as shown in FIG. 19A, in the same way as the first embodiment, the clamps 21, 22 are made to pivot counterclockwise against the spring forces of the coil springs and the clamps 23, 24 are made to pivot clockwise against the spring forces of the coil springs.

Note that, as shown in FIG. 16 and FIG. 17, in the second embodiment, to secure the paths of the clamps 84, 86 of the stacking jig 80, pluralities of clamp entry grooves 63 extending through the insides of the end support rods 26, 27 and the conveyor plate 20 are formed at the two side edge parts of the conveyor plate 20.

Figure 22A:
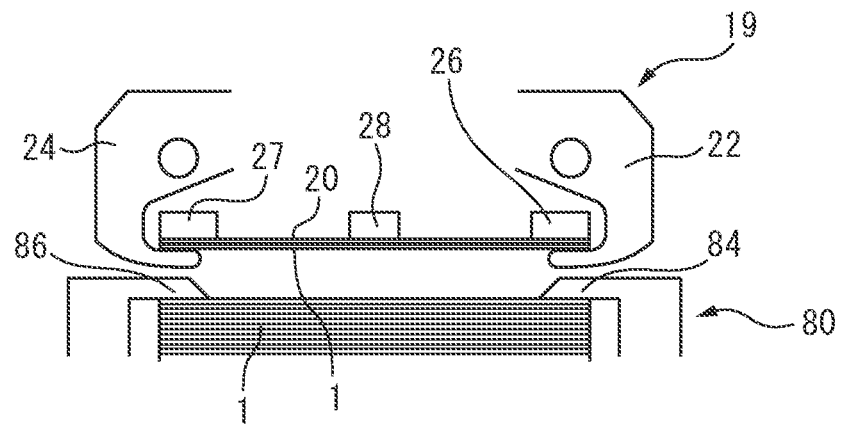
FIG. 22A, FIG. 22B, and FIG. 22C are views for explaining stacking work of sheet-shaped electrodes in the second embodiment.
Figure 22B:
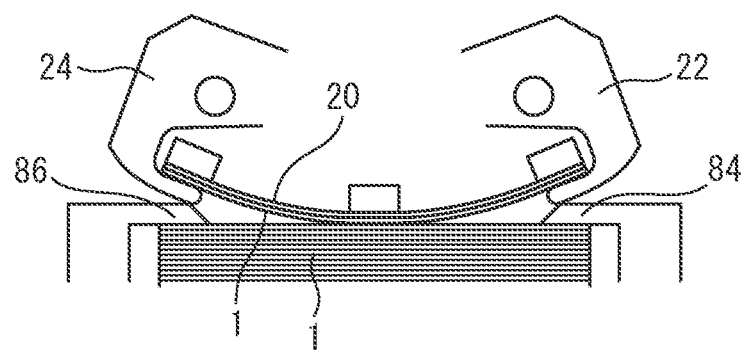

Next, referring to FIG. 22A to FIG. 24, a method of stacking the sheet-shaped electrodes 1 in the second embodiment of the conveyor plate support 19 will be explained. Note that, this stacking action of the sheet-shaped electrodes 1, in the same way as the first embodiment, is performed while the conveyor plate support 19 and stacking jig 80 move synchronously with each other. FIG. 22A shows when the new sheet-shaped electrode 1 carried on the conveyor plate 20 of the conveyor plate support 19 is aligned with the sheet-shaped electrodes 1 stacked inside the stacking jig 80. If the new sheet-shaped electrode 1 carried on the conveyor plate 20 is aligned with the sheet-shaped electrodes 1 stacked inside the stacking jig 80, the pressing mechanism 55 pushes the center support rod 28 of the conveyor plate 20 downward. As a result, as shown in FIG. 23B, the conveyor plate 20 is deformed from a flat state to a curved state and the center part of the new sheet-shaped electrode 1 carried on the conveyor plate 20 is pressed against the sheet-shaped electrodes 1 stacked inside the stacking jig 80.

Figure 22C:
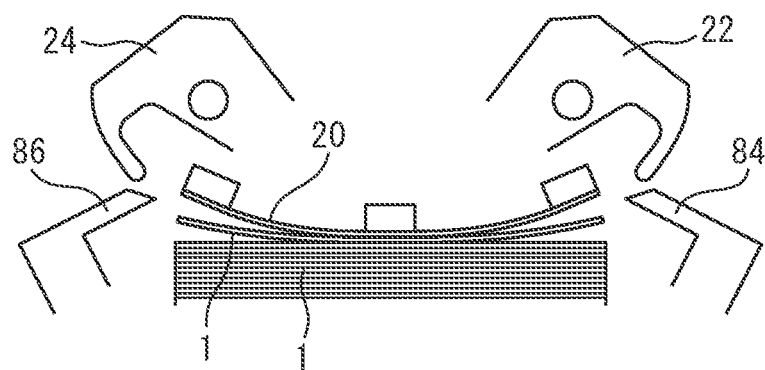

Next, as shown in FIG. 22C, in the state where the center part of the new sheet-shaped electrode 1 carried on the conveyor plate 20 is pressed against the sheet-shaped electrodes 1 stacked inside the stacking jig 80, the action of pressing down the sheet-shaped electrodes 1 inside the stacking jig 80 by the clamps 84, 86 is released and the action of pressing down the new sheet-shaped electrode 1 by the clamps 22, 24 of the conveyor plate support 19 is released. Due to this, the two side parts of the new sheet-shaped electrode 1 drop down toward the sheet-shaped electrodes 1 stacked inside the stacking jig 80. Up to here, the configuration is the same as the first embodiment.

Figure 23A:
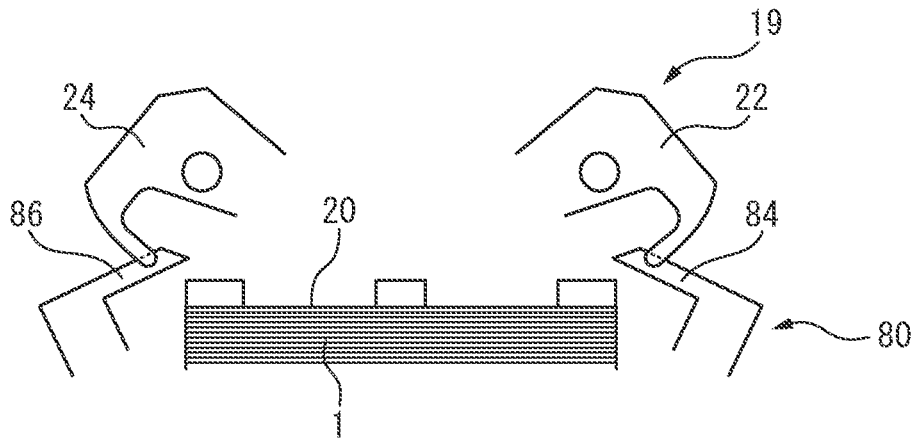
FIG. 23A, FIG. 23B and FIG. 23C are views for explaining stacking work of sheet-shaped electrodes in the second embodiment.
Figure 23B:
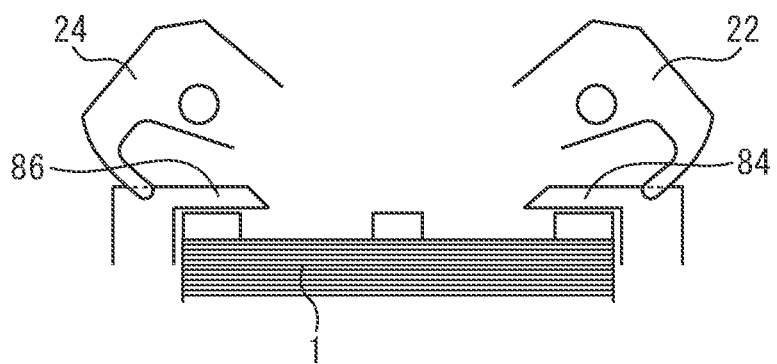

Next, in the second embodiment, as shown in FIG. 23A, in the state where the center part of the new sheet-shaped electrode 1 carried on the conveyor plate 20 is pressed against the sheet-shaped electrodes 1 stacked inside the stacking jig 80, the conveyor plate 20 is deformed from the curved state to the flat state. Due to this, the entire surface of the new sheet-shaped electrode 1 carried on the conveyor plate 20 is pressed against the sheet-shaped electrodes 1 stacked inside the stacking jig 80. Next, how the conveyor plate 20 is deformed from the curved state to the flat state will be explained.

As explained above, when releasing the action of pressing the sheet-shaped electrodes 1 against the conveyor plate 20 by the pressing parts 70 of the clamps 21, 22, 23, and 24, as shown in FIG. 19A, in the same way as the first embodiment, the fixed cam engaging with the roller 73 makes the clamps 21, 22 pivot counterclockwise against the spring forces of the coil springs and makes the clamps 23, 24 pivot clockwise against the spring forces of the coil springs. In this case, the more the pivot angles of the clamps 21, 22, 23, 24 increase, the greater the force required for making the clamps 21, 22, 23, 24 pivot. If this force exceeds the force required for making the end support rods 26, 27 supporting the clamps 21, 22, 23, 24, that is, the movable base plate 150, descend against the spring forces of the compression spring 157 of the anchor rods 155, the end support rods 26, 27 start to descend together with the movable base plate 150. FIG. 19A shows this time.

Next, if the fixed cam makes the roller 73 fall further, the clamps 21, 22, 23, 24 no longer pivot much at all and the end support rods 26, 27 supporting the clamps 21, 22, 23, 24 are made to descend together with the movable base plate 150 against the spring force of the compression spring 157 of the anchor rod 155. At this time, the descending action of the end support rods 26, 27 is continued until the conveyor plate 20 becomes a flat state. The time when the conveyor plate 20 becomes a flat state is shown in FIG. 19B, FIG. 20C, FIG. 21C, and FIG. 23A. As will be understood from FIG. 23A, at this time, the entire surface of the new sheet-shaped electrode 1 carried on the conveyor plate 20 is pressed against the sheet-shaped electrodes 1 stacked inside the stacking jig 80. Note that, at this time, as will be understood from FIG. 19B, FIG. 20C, and FIG. 21C, the movable base plate 150 greatly separates from the flat top part 40a of the base 40.

Figure 23C:
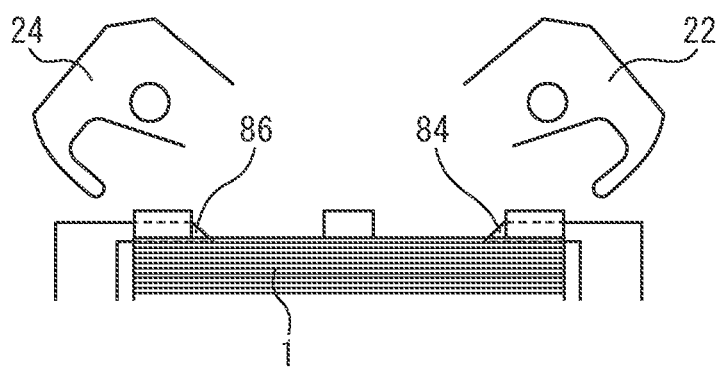
Figure 24:
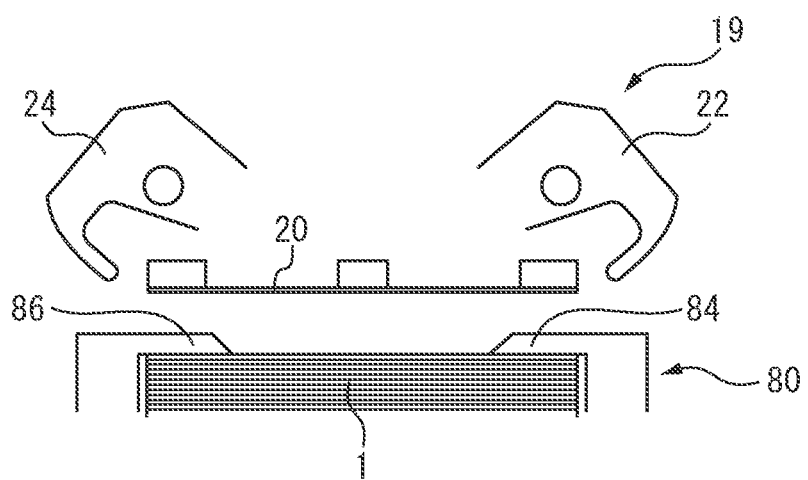
FIG. 24 is a view for explaining stacking work of sheet-shaped electrodes in the second embodiment.

As shown in FIG. 23A, if the entire surface of the new sheet-shaped electrode 1 carried on the conveyor plate 20 is pressed against the sheet-shaped electrodes 1 stacked inside the stacking jig 80, the clamps 84, 86 of the stacking jig 80 enter into the clamp entry grooves 63 shown in FIG. 16 and FIG. 17 resulting in the upright states such as shown in FIG. 23B. Next, the clamps 84, 86 of the stacking jig 80 are made to descend. Due to this, as shown in FIG. 23C, the sheet-shaped electrodes 1 stacked inside the stacking jig 80 are pressed down by the clamps 84, 86. If the sheet-shaped electrodes 1 stacked inside the stacking jig 80 are pressed down by the clamps 84, 86, the action of descending the rollers 73 of the clamps 21, 22, 23, 24 due to the fixed cam is released and the action of pushing downward the center support rod 28 of the conveyor plate 20 by the pressing mechanism 55 is released. Due to this, the movable base plate 150 is made to rise toward the flat top part 40a of the base 40 and the center support rod 28 of the conveyor plate 20 moves upward. As a result, as shown in FIG. 24, the conveyor plate 20 moves away from the sheet-shaped electrodes 1 stacked inside the stacking jig 80 while maintaining a flat state. Next, the conveyor plate support 19 is returned by the mover 12 to the placement position shown in FIG. 1.

In this way, in the second embodiment, in the state where the entire surface of the new sheet-shaped electrode 1 carried on the conveyor plate 20 is pressed against the sheet-shaped electrodes 1 stacked inside the stacking jig 80, the sheet-shaped electrodes 1 stacked inside the stacking jig 80 are pressed by the clamps 84, 86. In this way, by performing the work of stacking the sheet-shaped electrodes 1 inside the stacking jig 80 in the state where the entire surface of the new sheet-shaped electrode 1 carried on the conveyor plate 20 is pressed against the sheet-shaped electrodes 1 stacked inside the stacking jig 80, it is possible to greatly keep down the positional offset between the new sheet-shaped electrode 1 and the stacked sheet-shaped electrodes 1 at the time of stacking, therefore the new sheet-shaped electrode 1 can be stacked aligned with the stacked sheet-shaped electrodes 1 with a high precision.

Note that, in the embodiment according to the present invention, at the time of stacking, the conveyor plate 20 is made to deform from a flat state to a curved state so as to curve along the short direction of the conveyor plate 20, but of course, at the time of stacking, the conveyor plate 20 is made to deform from a flat state to a curved state so as to curve along the longitudinal direction of the conveyor plate 20. Further, in the embodiment according to the present invention, the conveyor plate 20 is formed from a flexible metal sheet with elasticity, but the conveyor plate 20 can also be formed from a sheet made of a plastic sheet with elasticity.

Up to here, the embodiments according to the present invention were explained with reference to an example where the sheet-shaped members were sheet-shaped electrodes for an all solid lithium ion secondary battery, but the present invention can be applied to sheet-shaped members other than sheet-shaped electrodes as well. Further, in the embodiments according to the present invention, the biasing mechanism for biasing the two side edge parts of the conveyor plate 20 in directions away from each other and the pressing mechanism for pressing against the center part of the conveyor plate 20 to make the conveyor plate 20 deform from a flat state to a curved state are used, and these biasing mechanism and pressing mechanism form an adjustment mechanism able to adjust the degree of curvature of the conveyor plate 20.

Therefore, in the embodiments according to the present invention, the flexible conveyor plate 20, the clamp mechanism 25 for holding the new sheet-shaped member carried on the conveyor plate 20 against the conveyor plate 20, and an adjustment mechanism able to adjust a degree of curvature of the conveyor plate 20 are provided. When stacking the new sheet-shaped member carried on the conveyor plate 20 on the already stacked sheet-shaped members, this adjustment mechanism makes the conveyor plate 20 deform from a flat state to a curved state to make the new sheet-shaped member carried on the conveyor plate 20 deform from a flat state to a curved state. In this case, in the embodiments according to the present invention, the new sheet-shaped member and the already stacked sheet-shaped members are comprised of sheet-shaped electrodes 1 and the sheet-shaped electrodes 1 contain a current collector-use metal foil and at least one of a positive electrode active substance layer and negative electrode active substance layer formed on this current collector-use metal foil.

Further, in the embodiments according to the present invention, the above-mentioned adjustment mechanism is provided with the biasing mechanism for biasing the two side edge parts of the conveyor plate 20 in directions away from each other and the pressing mechanism for pressing a center part of the conveyor plate positioned between the two side edge parts of the conveyor plate 20 in a direction vertical to the conveyor plate surface to make the conveyor plate 20 deform from a flat state to a curved state. In this case, in the embodiments according to the present invention, the end support rods 26, 27 extending along the two side edge parts of the conveyor plate 20 and the center support rod 28 extending in the same direction of the end support rods 26, 27 at the center part of the conveyor plate between the two side edge parts of the conveyor plate 20 are fixed on one side surface of the conveyor plate 20. The above-mentioned biasing mechanism is provided with the compression springs 52, 53 biasing the end support rods 26, 27 in directions away from each other. The above-mentioned pressing mechanism presses the center support rod 28 in a direction vertical to the conveyor plate surface. Further, in the embodiment according to the present invention, the above-mentioned clamp mechanism 25 is provided with a plurality of clamps 21, 22, 23, 24 attached to the end support rods 26, 27 to be able to pivot so as to press the new sheet-shaped member carried onto the conveyor plate 20 during conveyance to hold the new sheet-shaped member 1 at a placement position on the conveyor plate 20.

On the other hand, in the embodiments according to the present invention, the clamp mechanism 25 provided for the conveyor plate 20 holds the new sheet-shaped member on the conveyor plate 20 at the two side edge parts of the conveyor plate 20 and the stacking jig 80 for stacking the new sheet-shaped member carried on the conveyor plate 20 is provided. The stacking jig 80 is provided with the bottom plate 83 for supporting the sheet-shaped members and the clamp mechanism for holding the sheet-shaped members carried on the bottom plate 83 against the bottom plate 80. When stacking the new sheet-shaped member carried on the conveyor plate 20 on the sheet-shaped members already stacked inside the stacking jig 80, the new sheet-shaped member carried on the conveyor plate 20 is made to face the sheet-shaped members already stacked inside the stacking jig 80 and the center part of the conveyor plate positioned between the two side edge parts of the conveyor plate 20 is made to stick out toward the stacking jig 80 while holding the new sheet-shaped member on the conveyor plate 20 by the clamp mechanism 25 provided at the conveyor plate 20 to make the conveyor plate 20 deform from a flat state to a curved state. Due to this, the center part of the new sheet-shaped member held on the conveyor plate 20 is pressed against the sheet-shaped members already stacked inside the stacking jig 80. In the state where the center part of the new sheet-shaped member is pressed against the sheet-shaped members already stacked inside the stacking jig 80, the holding action of the new sheet-shaped member on the conveyor plate 20 by the clamp mechanism 25 provided for the conveyor plate 20 is released and the holding action of the sheet-shaped members in the stacking jig 80 by the clamp mechanism of the stacking jig 80 is released. Due to this, the sheet-shaped members carried on the conveyor plate 20 are stacked inside the stacking jig 80.

In this case, in the embodiment according to the present invention, the conveyor plate 20 and the above-mentioned adjustment mechanism are attached to the mover 12 of the linear motor running on the rail 10 and the jig conveyance device for conveying the stacking jig 80 is provided. When stacking the new sheet-shaped member carried on the conveyor plate 20 on the sheet-shaped members stacked inside the stacking jig 80, the conveyor plate 20 and the stacking jig 80 are made to synchronously move so that the upper surface of the stacking jig 80 continues to face the new sheet-shaped member carried on the conveyor plate 20.

Further, in the embodiment according to the present invention, a stacking method for stacking the new sheet-shaped member on already stacked sheet-shaped members comprises the steps of arranging the new sheet-shaped member so as to be spaced from and aligned with the already stacked sheet-shaped member, making the new sheet-shaped member deform from a flat state to a curved state to make the center part of the new sheet-shaped member press against the already stacked sheet-shaped members and, stacking the new sheet-shaped member on the already stacked sheet-shaped members in a state where the center part of the new sheet-shaped member is made to press against the already stacked sheet-shaped members. In this case, in this embodiment according to the present invention, the new sheet-shaped member and the already stacked sheet-shaped members are comprised of sheet-shaped electrodes 1 and each sheet-shaped electrode 1 contains a current collector-use metal foil and at least one of a positive electrode active substance layer and negative electrode active substance layer formed on this current collector-use metal foil.

Further, in the embodiment according to the present invention, a stacking method for stacking the new sheet-shaped member on the already stacked sheet-shaped members comprises the steps of arranging the new sheet-shaped member so as to be spaced from and aligned with the already stacked sheet-shaped member, making the center part of the new sheet-shaped member stick out toward the already stacked sheet-shaped members while holding the two side edge parts of the new sheet-shaped member by the clamp mechanism 25 whereby the new sheet-shaped member is made to deform from a flat state to a curved state to make the center part of the new sheet-shaped member press against the already stacked sheet-shaped members and, releasing an holding action of the new sheet-shaped member on the conveyor plate 20 by the clamp mechanism 25 and an holding action of the sheet-shaped members in the stacking jig 80 by another clamp mechanism of the stacking jig 80 in the state where the center part of the new sheet-shaped member is pressed against the already stacked sheet-shaped member inside the stacking jig 80 to thereby stack the new sheet-shaped member on the already stacked sheet-shaped members.

Further, in the embodiment according to the present invention, a stacking method for stacking the new sheet-shaped member on the already stacked sheet-shaped members comprises the steps of arranging the new sheet-shaped member so as to be spaced from and aligned with the already stacked sheet-shaped member, making the new sheet-shaped member deform from a flat state to a curved state to make the center part of the new sheet-shaped member press against the already stacked sheet-shaped members and, making the new sheet-shaped member deform from a curved state to a flat state in the state where the center part of the new sheet-shaped member is made to press against the already stacked sheet-shaped members to make the new sheet-shaped member as a whole press against the already stacked sheet-shaped members and thereby the new sheet-shaped member is stacked on the already stacked sheet-shaped members.

In this case, in the embodiment according to the present invention, a stacking method for stacking the new sheet-shaped member on the already stacked sheet-shaped members comprises the steps of arranging the new sheet-shaped member so as to be spaced from and aligned with the already stacked sheet-shaped member, making the center part of the new sheet-shaped member stick out toward the already stacked sheet-shaped members while holding the two side edge parts of the new sheet-shaped member by the clamp mechanism 25 whereby the new sheet-shaped member is made to deform from a flat state to a curved state to make the center part of the new sheet-shaped member press against the already stacked sheet-shaped members, releasing an holding action of the new sheet-shaped member on the conveyor plate 20 by the clamp mechanism 25 and an holding action of the sheet-shaped members in the stacking jig 80 by another clamp mechanism of the stacking jig 80 and making the new sheet-shaped member deform from a curved state to a flat state in the state where the center part of the new sheet-shaped member is pressed against the already stacked sheet-shaped member inside the stacking jig to thereby make the new sheet-shaped member as a whole press against the already stacked sheet-shaped members, and holding the new sheet-shaped member on the already stacked sheet-shaped member by the other clamp mechanism of the stacking jig 80 in the state where the new sheet-shaped member as a whole is pressed against the already stacked sheet-shaped member to thereby stack the new sheet-shaped member on the already stacked sheet-shaped members.

The invention claimed is:

1. A stacking apparatus comprising:
   a flexible conveyor plate,
   a clamp mechanism for holding a new sheet-shaped member carried on the conveyor plate against the conveyor plate, and
   an adjustment mechanism able to adjust a degree of curvature of the conveyor plate, wherein the adjustment mechanism makes the conveyor plate deform from a flat state to a curved state to make the new sheet-shaped member carried on the conveyor plate deform from a flat state to a curved state when stacking the new sheet-shaped member carried on the conveyor plate onto already stacked sheet-shaped members.

2. The stacking apparatus according to claim 1, wherein the new sheet-shaped member and the already stacked sheet-shaped members are comprised of sheet-shaped electrodes and each sheet-shaped electrode contains a current collector-use metal foil and at least one of a positive electrode active substance layer and negative electrode active substance layer formed on the current collector-use metal foil.

3. The stacking apparatus according to claim 1, wherein the adjustment mechanism comprises a biasing mechanism for biasing two side edge parts of the conveyor plate in directions away from each other and a pressing mechanism for pressing a center part of the conveyor plate positioned between the two side edge parts of the conveyor plate in a direction vertical to a conveyor plate surface to make the conveyor plate deform from a flat state to a curved state.

4. The stacking apparatus according to claim 3, wherein end support rods extending along the two side edge parts of the conveyor plate and a center support rod extending at a center part of the conveyor plate between the two side edge parts of the conveyor plate in the same direction as the end support rods are fixed on one side surface of the conveyor plate, the biasing mechanism comprises compression springs biasing the end support rods in directions away from each other, and the pressing mechanism presses the center support rod in a direction vertical to the conveyor plate surface.

5. The stacking apparatus according to claim 4, wherein the clamp mechanism comprises a plurality of clamps attached to the end support rods to be able to pivot so as to press the new sheet-shaped member carried on the conveyor plate onto the conveyor plate during conveyance to hold the new sheet-shaped member at a placement position on the conveyor plate.

6. The stacking apparatus according to claim 1, wherein the clamp mechanism provided for the conveyor plate holds the new sheet-shaped member on the conveyor plate at the two side edge parts of the conveyor plate,
- a stacking jig for stacking the new sheet-shaped member carried on the conveyor plate is provided,
- the stacking jig comprises a bottom plate for supporting the sheet-shaped member and a clamp mechanism for holding the sheet-shaped member carried on the bottom plate against the bottom plate,
- when stacking the new sheet-shaped member carried on the conveyor plate on the already stacked sheet-shaped members inside the stacking jig, the new sheet-shaped member carried on the conveyor plate is made to face the already stacked sheet-shaped member inside the stacking jig, a center part of the conveyor plate positioned between the two side edge parts of the conveyor plate is made to stick out toward the stacking jig while holding the new sheet-shaped member on the conveyor plate by the clamp mechanism provided for the conveyor plate to make the conveyor plate deform from a flat state to a curved state, whereby the center part of the new sheet-shaped member held on the conveyor plate is pressed against the already stacked sheet-shaped members inside the stacking jig, and,
- in the state where the center part of the new sheet-shaped member is pressed against the already stacked sheet-shaped member inside the stacking jig, a holding action of the new sheet-shaped member on the conveyor plate by the clamp mechanism provided for the conveyor plate is released and a holding action of the sheet-shaped members in the stacking jig by the clamp mechanism of the stacking jig is released whereby the sheet-shaped members carried on the conveyor plate are stacked inside the stacking jig.

7. The stacking apparatus according to claim 6, wherein the conveyor plate and the adjustment mechanism are attached to a mover of a linear motor running on a rail,
- a jig conveyance device for conveying the stacking jig is provided,
- when stacking the new sheet-shaped member carried on the conveyor plate on the already stacked sheet-shaped members inside the stacking jig, the conveyor plate and stacking jig are made to move synchronously so that a top surface of the stacking jig continues to face the new sheet-shaped member carried on the conveyor plate.

* * * * *